(12) United States Patent
Paliath-Pathiyal et al.

(10) Patent No.: US 11,501,626 B2
(45) Date of Patent: Nov. 15, 2022

(54) HAND HYGIENE DEVICE, SYSTEM, AND METHOD

(71) Applicants: Milind Paliath-Pathiyal, San Jose, CA (US); Hrishi Paliath-Pathiyal, San Jose, CA (US); Krishna Kumar Pathiyal, San Jose, CA (US)

(72) Inventors: Milind Paliath-Pathiyal, San Jose, CA (US); Hrishi Paliath-Pathiyal, San Jose, CA (US); Krishna Kumar Pathiyal, San Jose, CA (US)

(*) Notice: Subject to any disclaimer, the term of this patent is extended or adjusted under 35 U.S.C. 154(b) by 0 days.

(21) Appl. No.: 17/218,889

(22) Filed: Mar. 31, 2021

(65) Prior Publication Data

US 2021/0312788 A1 Oct. 7, 2021

Related U.S. Application Data

(60) Provisional application No. 63/003,514, filed on Apr. 1, 2020.

(51) Int. Cl.
| | | |
|---|---|---|
| *G08B 21/00* | (2006.01) | |
| *G08B 21/24* | (2006.01) | |
| *G06V 40/20* | (2022.01) | |

(52) U.S. Cl.
CPC ........... *G08B 21/245* (2013.01); *G06V 40/28* (2022.01)

(58) Field of Classification Search
CPC . G08B 21/245; G06K 9/00355; G07F 11/002; G07F 9/006; G07F 9/026; G06Q 10/087
See application file for complete search history.

(56) References Cited

U.S. PATENT DOCUMENTS

| | | | | |
|---|---|---|---|---|
| 6,125,482 | A * | 10/2000 | Foster | E03C 1/046 4/623 |
| 9,830,764 | B1 * | 11/2017 | Murphy | G07F 9/023 |
| 10,818,157 | B1 * | 10/2020 | Koester | B05B 12/004 |
| 2004/0001009 | A1 | 1/2004 | Winnings et al. | |
| 2006/0273915 | A1 | 12/2006 | Snodgrass | |
| 2010/0073162 | A1 * | 3/2010 | Johnson | G08B 21/245 340/540 |
| 2011/0206378 | A1 * | 8/2011 | Bolling | G08B 21/245 398/108 |
| 2011/0291841 | A1 * | 12/2011 | Hollock | G08B 21/245 340/573.1 |
| 2012/0212344 | A1 * | 8/2012 | Forsberg | G16H 40/20 340/573.1 |

(Continued)

OTHER PUBLICATIONS

Medgadget Editors, "SureWash Uses Computer Vision to Teach Proper Hand Washing Techniques," Nov. 27, 2017, 4 pages, available at https://www.medgadget.com/2017/11/surewash-uses-computer-vision-teach-proper-hand-washing-techniques.html.

*Primary Examiner* — An T Nguyen
(74) *Attorney, Agent, or Firm* — Behmke Innovation Group LLC; Kenneth J. Heywood; Jonathon P. Western

(57) ABSTRACT

In one embodiment, a device obtains sensor data captured by one or more sensors deployed in a washroom, the sensor data comprising audio signals. The device identifies, using the sensor data as input to one or more machine learning-based classifiers, one or more events associated with a user of the washroom. The device makes a decision as whether the one or more events comply with a hand hygiene protocol. The device provides data indicative of the decision for presentation to the user.

18 Claims, 33 Drawing Sheets

(56) References Cited

U.S. PATENT DOCUMENTS

| | | | |
|---|---|---|---|
| 2013/0229276 A1* | 9/2013 | Hunter | G08B 21/245 340/501 |
| 2014/0327545 A1* | 11/2014 | Bolling | G08B 21/245 340/573.1 |
| 2015/0170502 A1* | 6/2015 | Harris | G08B 21/245 340/573.1 |
| 2015/0194043 A1* | 7/2015 | Dunn | G08B 21/245 340/573.1 |
| 2017/0256155 A1* | 9/2017 | Sengstaken, Jr. | G06K 19/0723 |
| 2018/0047277 A1* | 2/2018 | Thyroff | G08B 21/24 |
| 2018/0151054 A1* | 5/2018 | Pi | G08B 21/245 |
| 2018/0221527 A1* | 8/2018 | Riggio | A61L 2/16 |
| 2018/0293873 A1* | 10/2018 | Liu | G06K 7/10366 |
| 2019/0012898 A1* | 1/2019 | Wittrup | G08B 21/245 |
| 2019/0043337 A1* | 2/2019 | Liu | G16H 40/20 |
| 2019/0295548 A1* | 9/2019 | Kanfer | G07F 9/002 |
| 2019/0384968 A1* | 12/2019 | Brown | G06V 20/52 |
| 2020/0074835 A1* | 3/2020 | Waghode | G16H 40/20 |
| 2020/0074836 A1* | 3/2020 | Kolavennu | G08B 21/245 |
| 2020/0090644 A1 | 3/2020 | Klinger et al. | |
| 2020/0302775 A1* | 9/2020 | Liu | G06K 7/10366 |
| 2020/0320846 A1 | 10/2020 | Tripani | |
| 2020/0323397 A1* | 10/2020 | Simonovsky | G06K 7/10366 |
| 2021/0110700 A1* | 4/2021 | Harman | G06V 20/46 |

\* cited by examiner

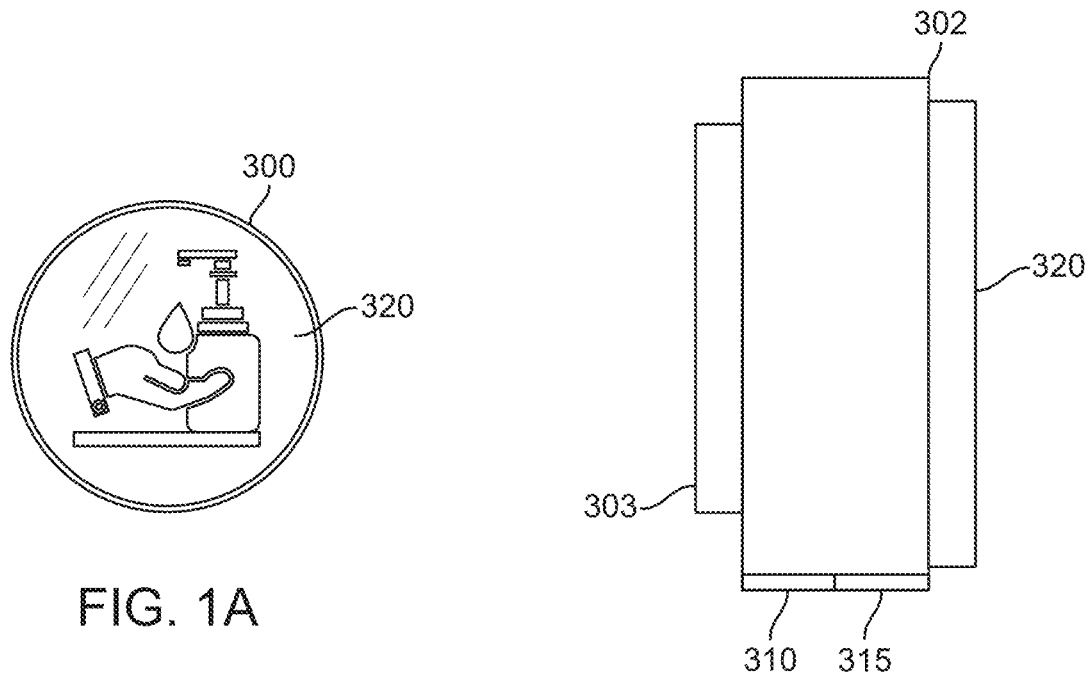
FIG. 1A
FIG. 1B
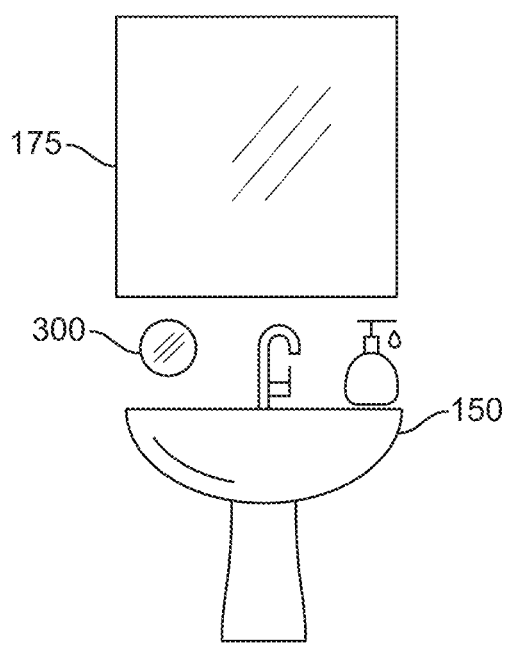
FIG. 1C

| Exemplary Trigger Sounds | Exemplary Trigger Motions |
|---|---|
| Water faucet handles opening and/or closing | Water faucet open or closed |
| Water flowing from the faucet | Water flowing from faucet |
| Soap dispenser being used | Soap dispenser in operation |
| Lathering of hands with soap | Lathering of hands with soap |
| Rinsing hands with water | Rinsing hands with water |
| Drying hands with towels | Drying hands with towels |
| Drying hands with air dryer | Drying hands with air dryer |
| Doors opening and/or closing | Doors opening and/or closing |
| Urinal use | User walking to urinal or toilet area |
| Urinal flush | User walking from urinal or toilet area |
| Toilet flush | User approaching sink |
| Footsteps of a user walking towards sink | User walking away from sink |
| Footsteps of a user walking away from sink | User exiting washroom |
| User exiting washroom | User entering washroom |
| User entering washroom | |
| Shower usage | |
| Bathtub usage | |
| Fan usage | |

FIG. 4A

| User Deviation | Device Response |
|---|---|
| User ignores handwashing altogether after using washroom facilities | Audio alert and/or visual message to return to the recommended handwashing protocol - example: "Please wash your hands to help reduce the spread of disease." |
| The user walks away before completing all steps of recommended handwashing | Audio alert and/or visual message to return to the recommended handwashing protocol - example:<br><br>"Almost done! A few more important steps for clean hands."<br><br>Optionally, signal sent to janitorial staff to disinfect door handles. |
| The user stops scrubbing hands with soap prematurely | Audio alert and/or visual message to return to the recommended handwashing protocol - example:<br><br>"Keep scrubbing! Only 5 seconds more to go!" |
| The user does not apply soap to hands | Audio alert and/or visual message to return to the recommended handwashing protocol - example:<br><br>"Keep scrubbing! Only 5 seconds more to go!" |
| The user does not rinse hands with water | Audio alert and/or visual message to return to the recommended handwashing protocol - example:<br><br>"Don't forget to rinse your hands with water!" |
| The user does not dry their hands | Audio alert and/or visual message to return to the recommended handwashing protocol - example:<br><br>"Don't forget to dry your hands!" |

FIG. 4B

| Voice Recognition for Washroom Related Issues |
|---|
| No soap |
| No paper towels |
| The towel dispenser is broken |
| The soap dispenser is broken |
| The washroom is dirty/ washroom needs cleaning |
| The sink is dirty/Sink needs cleaning |

FIG. 4C

HAND HYGIENE DEVICE, SYSTEM, AND METHOD

CROSS-REFERENCE TO RELATED APPLICATIONS

This application claims the benefit of U.S. Provisional Patent Application No. 63/003,514 filed Apr. 1, 2020, the entire contents of which is hereby incorporated by reference as if fully set forth herein.

TECHNICAL FIELD

The present disclosure generally relates to sensor systems and sensor analytics. More specifically, embodiments of the disclosure relate to devices, systems, and methods for hand hygiene.

BACKGROUND

Regular hand washing is considered the most important precaution to reduce the chances of contamination from germs and viruses, such as the coronavirus known as COVID-19, lingering on surfaces. In the era of reducing the spread of germs and viruses, there is a heightened interest in improving compliance with this form of personal hygiene—sometimes referred to as hand hygiene. Indeed, the U.S. Centers for Disease Control and Prevention (CDC) states handwashing is one of the most effective ways to cut the spread of infectious diseases. Dirty hands are estimated to contribute to 50 percent of all foodborne illness outbreaks.

Most handwashing facilities today are actually quite antiquated, with many washrooms simply including a sink, soap, and some form of mechanism for drying one's hands (e.g., towels, air dryers, etc.). However, new opportunities now exist to modernize such facilities, thanks to the recent proliferation of sensor technologies. In addition to introducing new sensor systems for handwashing facilities, custom data analytic techniques are also introduced herein that work in conjunction with these sensor systems, to improve today's handwashing facilities and can greatly help to reduce the spread of contagious diseases.

BRIEF DESCRIPTION OF DRAWINGS

The example embodiment(s) of the present disclosure are illustrated by way of example, and not in way by limitation, in the figures of the accompanying drawings in which like reference numerals refer to similar elements and in which:

FIGS. 1a and 1b illustrate, respectively, a frontal and side view of an exemplary embodiment of a device embodying the present disclosure.

FIG. 1c illustrates an example location of the device relative to a washroom sink.

FIG. 4a contains a table illustrative of exemplary of trigger/event sounds and motions in the ambient environment of a washroom.

FIG. 4b contains a table illustrative of exemplary of the device output reinforcement according to one or more embodiments.

FIG. 4c contains a table illustrative of the voice messages the device may detect and recognize according to one or more embodiments.

Figure 2:
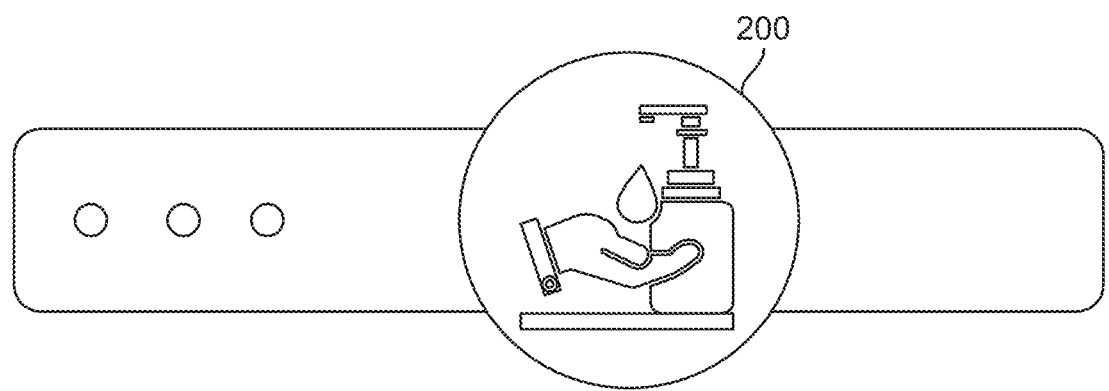
FIG. 2 illustrates a wearable embodiment of the device.

While each of the figures illustrates a particular embodiment for purposes of illustrating a clear example, other embodiments may omit, add to reorder, and/or modify any of the elements show in the figures.

DETAILED DESCRIPTION

In the following description, for the purposes of explanation, numerous specific details are set forth in order to provide a thorough understanding of the example embodiment(s) of the present disclosure. It will be apparent, however, that the example embodiment(s) may be practiced without these specific details. In other instances, well-known structures and devices are shown in block diagram form in order to avoid unnecessarily obscuring the example embodiment(s).

As would be appreciated, sensor systems are introduced herein that can be deployed to handwashing facilities, to capture various sensor data. According to various embodiments, as detailed further below, machine learning, statistical, and/or heuristic techniques can be used on the captured sensor data for purposes of ensuring compliance with recommended handwashing guidelines, reporting, and/or other functions.

In general, machine learning is concerned with the design and the development of techniques that recognize complex patterns in a set of input data, such as sensor data captured by the sensor systems herein. In various embodiments, example machine learning techniques that can be used to implement the techniques herein may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), deep learning neural networks (DNNs), replicating reservoir networks (e.g., for non-linear models, typically for time series), random forest classification, convolutional networks (CNN), or the like.

In various embodiments, the data analytics techniques herein may be performed using one or more supervised, unsupervised, or semi-supervised machine learning models. Generally, supervised learning entails the use of a training set of data that is used to train the model to apply labels to the input data. For example, the training data may include sample sensor that has been labeled as being indicative of compliant or non-compliant with acceptable handwashing protocols. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. The unsupervised models may learn from data it takes in but not train prior to deployment. Semi-supervised learning models take a middle ground approach that uses a greatly reduced set of labeled training data, allowing training data to be extrapolated from a smaller set of labeled data.

Handwashing appears to be a simple well-bounded problem; however, depending on the accuracy of ensuring a user's compliance with recommended handwashing protocol, the problem becomes a more complex and challenging technical problem. There are, in fact, several actions a user may take that deviate from the recommended handwashing protocol. Static signage describing the protocol is sometimes not sufficiently understood, and users are not held accountable in real-time to comply when they deviate from the recommended handwashing protocol. One or more goals of the present disclosure are to increase hand hygiene compliance, namely: (1) to encourage a user to wash his/her hands in a particular environment where the device is situated, and (2) to guide users to wash their hands in the recommended protocol.

Some handwashing actions a user may take include: start the handwash; stop the handwash; proper lathering; improper lathering; touching of faucet handles with hands; touching of a tap handles with something other than hands such as an elbow; touching of faucet tap handles with a towel; use of soap; handwashing with no use of soap; drying hands with a towel or hand air-dryer; not drying hands with a towel or hand air dryer, etc. However, the user's behavior is influenced by numerous factors. Factors may include the social need to participate in the need to help the collective good to stop the spread of viruses, and diseases; the cleanliness of the washroom; the availability of soap, towels and/or air dryers; user knowledge of recommended handwashing protocol; accountability imposed on the user; some form of influence/oversight that encourages the user to comply with a recommended handwashing protocol, or some combination thereof.

The device, system, and method described herein describe techniques to help encourage compliance with a recommended handwashing protocol by instructing the user on the protocol steps by displaying appropriate instructions in real-time when the user is about to wash his/her hands. Depending on the embodiment of the present disclosure, various advantages may result. The protocol instructions may be in the form of images, animations, video, or some combination thereof. This output assists certain types of learners to better understand and comply with the recommended handwashing protocol. Advantageously, the device is programmed or configured to provide this protocol instruction contemporaneously when the user is or about to wash his/her hands.

Further, functioning washrooms elements such as toilets, faucets, soap dispensers, and sinks do not necessarily require replacement or modification. Also, the device requires limited space and provides the intended compliance without requiring physical interaction with the device. Further advantageously, the user need not be expected to remember the best steps to properly wash his/her hands but is reminded of these recommended steps contemporaneously when washing his/her hands. When the user deviates from the recommended handwashing protocol, the device may be programmed or configured to modify its behavior to encourage the user to comply with the recommended handwashing protocol. For instance, the system may evaluate compliance with the recommended handwashing protocol set out by the World Health Organization (WHO):

Step 1: Wet hands with safe running water
Step 2: Apply enough soap to cover wet hands
Step 3: Scrub all surfaces of the hands for at least 20 seconds
Step 4: Rinse thoroughly with running water
Step 5: Dry hands with a clean, dry cloth, single-use towel, or hand drier as available
Step 6: Turn off water with a towel or elbow.

Step 3 above is broken into substeps to ensure the cleaning of all surfaces by recommending the following scrubbing steps:

Step 3a: Rub hands palm to palm;
Step 3b: Rub right palm over left dorsum with interlaced fingers and vice versa;
Step 3c: Rub palm to palm with fingers interlaced;
Step 3d: Rub backs of fingers to opposing palms with fingers interlocked;
Step 3e: Rotational rubbing of left thumb clasped in right palm and vice versa; and,
Step 3f: Rotational rubbing, backward and forwards with clasped fingers of the right hand in left palm and vice versa.

Alternatively, the techniques herein may be used to enforce other hand hygiene protocols, as desired.

FIGS. 1a-c

FIG. 1a is an example of a physical embodiment of device 300 in a frontal view. The display 320 presents an illustrative example of one step of several recommended steps to properly wash hands, namely Step 2: Apply soap to the hands. FIG. 1b illustrates an example of the side view of device 300 showing the housing 302, display 320, wall bracket mechanism 303, audio capture device (microphone) 310, an audio output device (speaker) 315 according to one or more embodiments. FIG. 1c illustrates the placement of device 300 relative to the sink 150 and mirror 175 according to one or more embodiments. Device 300 may be installed in various locations, including on or in the mirror, on the sink counter, or affixed to an adjacent wall to the sink. A goal is to ensure the user has a visual line of sight to the display 320 of the device when in operation.

FIG. 2

FIG. 2 shows a user wearable embodiment of the present disclosure—namely, a smartwatch device 200. The smartwatch device 200 may work as a companion device with other devices such as a mobile phone (not shown) or device 300. The device 200 is programmed with the functions described herein and may use information communicated by the user's mobile phone to cause certain output behavior. For example, with location-based services are shared by the mobile phone with the device 200, the device 200 recognizes when the user returns to his/her home after an outdoor trip, thereby outputting instructions to the user to wash his/her hands upon arrival home. The wearable device 200 also detects handwashing motion to trigger output to encourage adherence to the recommended time for washing the user's hands. While FIG. 2 depicts a smartwatch device 200, in other embodiments, the present disclosure's techniques can be implemented with different types of wearables instead, such as smart glasses, a fitness tracker, a smart ring, etc.

Figure 3A:
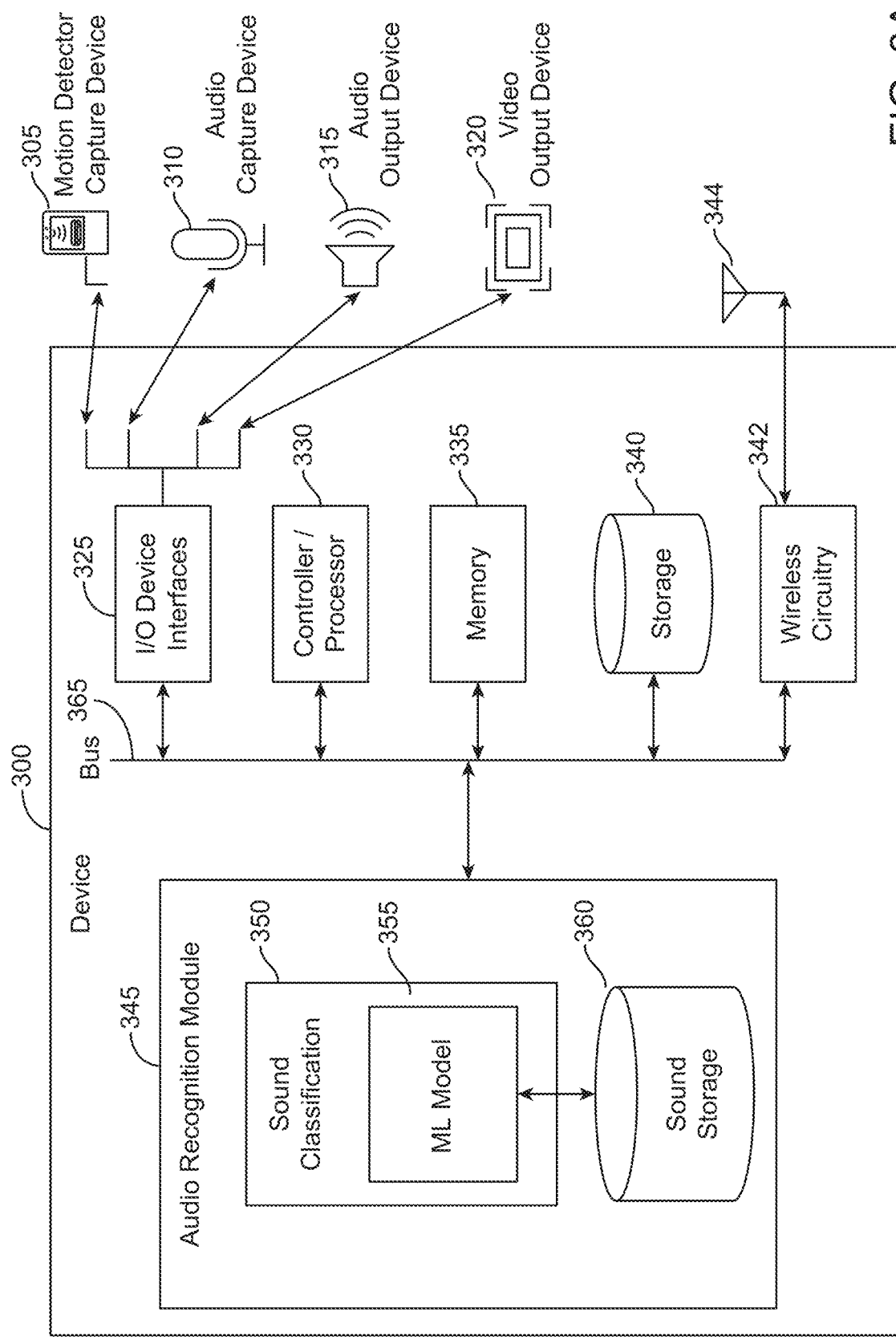
FIG. 3a illustrates a block diagram of an embodiment of the device.

FIGS. 3a and 4a

FIG. 3a illustrates a block diagram of example device 300 in which the techniques described herein may be practiced, according to some embodiment. Device 300 is programmed or configured to encourage handwashing and compliance with a recommended handwashing protocol. FIG. 3a illustrates only one of many possible arrangements of components configured to execute the programming or functionality described herein. Other arrangements of components, and the division of work between the components may vary depending on the arrangement. The diagram systematically illustrates a device 300 to receive movement/audio input sensor data and to process the sensor data through analytics according to one or more embodiments. FIG. 3a shows a system for detecting certain sounds and/or motions by the device according to one aspect of the present disclosure. The system includes an electronic device 300 that may be executing software that is monitoring for a trigger. The term trigger or event is used generically here as referring to any sound and/or motion input that may be detected by one or more I/O Device Interfaces 325 and that may cause, based on that detection, the software programmed in the device 300 to respond or take specific actions to encourage hand hygiene compliance.

With reference to FIG. 4a, a table contains examples of trigger sounds, in the first column, in the ambient environment. These sounds are those typically found near a washbasin/sink, such as in a washroom. The terms washroom, bathroom, toilet room, and water closet are used interchangeably herein and refer generally to a space including at least a handwashing sink or basin. One skilled in the art appreciates many other sounds may be recognized and are within the scope of the present disclosure. If, for example, the device 300 is set next to the entryway of a home, the trigger sounds include entryway doors and garage doors opening and closing. FIG. 4a also includes in the second column of the table examples of trigger motions in the ambient environment that may recognized by the device 300. The listed motions do not necessarily have any relation to the first column of sounds. Further examples of trigger motions recognized by device 300 may include the hand motions illustrated in FIGS. 7a-7l.

The block diagram of device 300 is not limited to the existing components illustrated in FIG. 3a. For example, although not shown, the device will preferably include a power source, such as a rechargeable/disposable battery or connection to the building's AC/DC power system, to power the device 300. The current components may be used in the construction of the device 300. The device 300 may also not be limited to just the quantity of components displayed in FIG. 3a. The device 300 could be subject to multiple audio capture devices 310, multiple controllers/processors 330, and multiple device interfaces 325 to improve device 300 performance if needed. The device 300 may also be constructed in a way to have the components connected and/or communicating to the "cloud."

Device 300 may contain a motion detector capture device 305 that will detect motion in and around device 300. Various types of sensors may be used for this purpose, including passive motion sensors (such as PIR sensors) and active motion sensors (such as LIDAR (Light Detection and Ranging) sensors).

Device 300 may contain an audio capture device 310. The audio capture device 310 may contain one or more microphones (e.g., an array of microphones) which are transducers configured to receive a sound field in the ambient environment of the device 300, and in response, provide one or more audio signals corresponding to it.

Device 300 may also contain audio output devices 315 for producing notification sounds and/or audio messages and/or instructions. The device 300 may contain a video output device 320, such as e-ink display, LCD, LED and projection displays, to display images, video, and/or text.

Device 300 may include an address/data bus 365 to transfer information throughout all components within the device 300. Each component within the device 300 will be connected to other components across the address/data bus 365. The device 300 may include a controller/processor 330, which may serve as the central processing unit for processing data and computer-readable instructions. The memory within the device 300 may include RAM, ROM, and other types of memory. The device 300 may also contain a data storage 340 component for storing instructions and data. The device 300 may also be connected to removable or external memory storage (not shown) through input/output device interfaces. The wireless communications circuitry 342 may be one or more integrated circuits and/or other hardware components configured to transmit and/or receive data with a cellular network, a short-range network (such as Bluetooth)/or a WiFi network. Thus, the wireless communications circuitry 342 may include components (such as one or more baseband processors, digital signal processing (DSP) circuits, transceivers, radio frequency (RF) front ends, and/or other components) that are configured for communication with the appropriate network. In various embodiments, the wireless communications circuitry 342 may include components for communicating (a) only with cellular networks, (b) only with short-range networks such as Bluetooth, (c) only with WiFi networks, or (d) for communicating with some combination thereof. The wireless communications circuitry 342 may be coupled to one or more antennas 344. Whenever it is described herein that the device 300 communicates data to/from a wireless network to another network such as the "cloud," communication may be performed using one or more antennas. The device 300 includes input/output device interfaces 325 in communication with various input/output devices. The device 300 and its various components may be executed by the controller/processor and be stored in the memory, storage, an external device, or in memory/storage included in an Audio Recognition module (ARM) 345 discussed below.

The ARM 345 is a system within the device 300 used for processing audio signals from sounds into triggering software in the controller/processor 330 to activate certain responsive outputs by device 300. Outputs comprise informational displays (shown in FIGS. 7a-7m) via the video output device 320 and/or audio output device 315. The ARM 345 may include a sound classifier system 350 based on a machine learning (ML) model 355 configured to recognize different audio signals detected in the ambient environment of the device 300. ARM 345 may store the audio signals in a sound storage 360 to improve the device's 300 sound recognition quality.

Although not shown, the system includes a plurality of feature extractors or feature extraction components or modules that may be in the form of software stored in the memory of the device 300 and is executed by the processor 330. The feature extractors digitally process the audio signals so as to determine various features (characteristics) of the audio signal. Extracted audio features may be used to classify certain sounds to determine whether user is following the recommended handwashing protocol by the CDC. These features may also be described as those of the sound or sound field picked up in the audio signals associated with those trigger sounds, such as those set out in the table in FIG. 4a.

The system's classifier 350 or sound classification module as software being executed by the processor, employs or otherwise includes a machine learning model 355, though other statistical models and algorithms can be used without departing from the scope of the present disclosure. Also, the system includes a database 360 that stores historical sound data or information, such as previously stored sound metadata, that can be accessed by the classifier 350. The classifier 350 determines a classification of the audio signal based upon the audio signal's determined features and, preferably, also based on the localized and labeled sound samplings provided at the installation of various trigger sounds in the ambient environment of the device 300's installation location. In one variation, the classifier 350 makes a binary classification and determines whether the audio signal relates to a trigger sound versus a non-trigger sound. However, the classifier could also classify a sound as being one of a number of other classifications (e.g., one or more of three or more classifications) or sub-classifications without departing from the scope of the present disclosure.

The device 300 may train on an audio signal dataset to enhance its precision in methods to encourage compliance with recommended handwashing protocol. By way of example, when the ARM 345 recognizes the sound of water flowing, ARM 345 triggers software in the processor 330 to display what could be shown in FIG. 7b—namely: "Apply soap to hands." The ARM advantageously also provides insight to device's 300 hand hygiene compliance algorithm where ambient environment motion cannot be detected by the field of sight of the motion detector capture device 305. For example, the ARM may be programmed to recognize the use of a toilet by just the sound of the flush of the toilet cistern well before any motion can be detected by the Motion Recognition Module (MRM) of a user walking past the device 300 after the toilet use—to be discussed next.

Figure 7A:
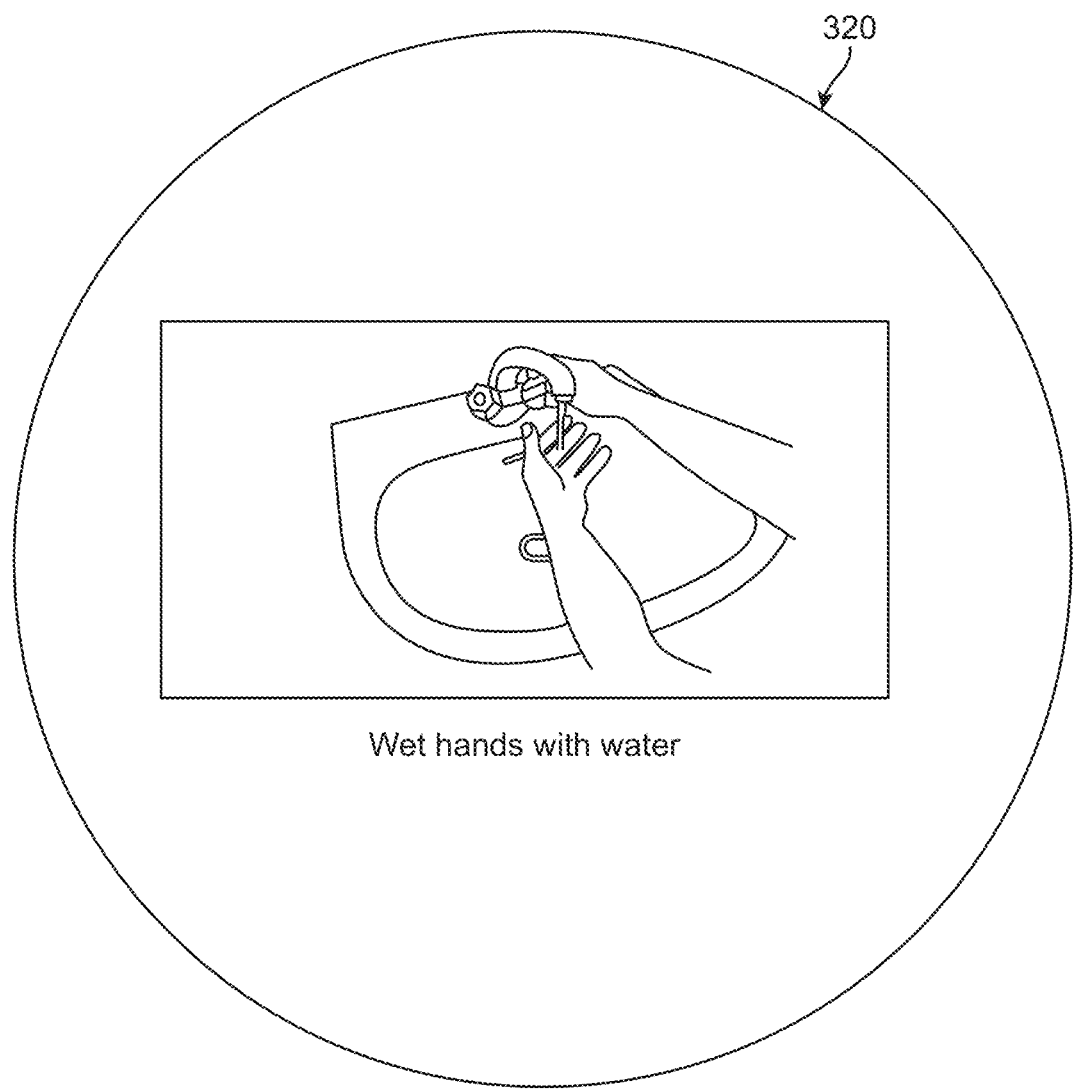
FIGS. 7a-7m illustrate exemplary display outputs of the device.
Figure 7B:
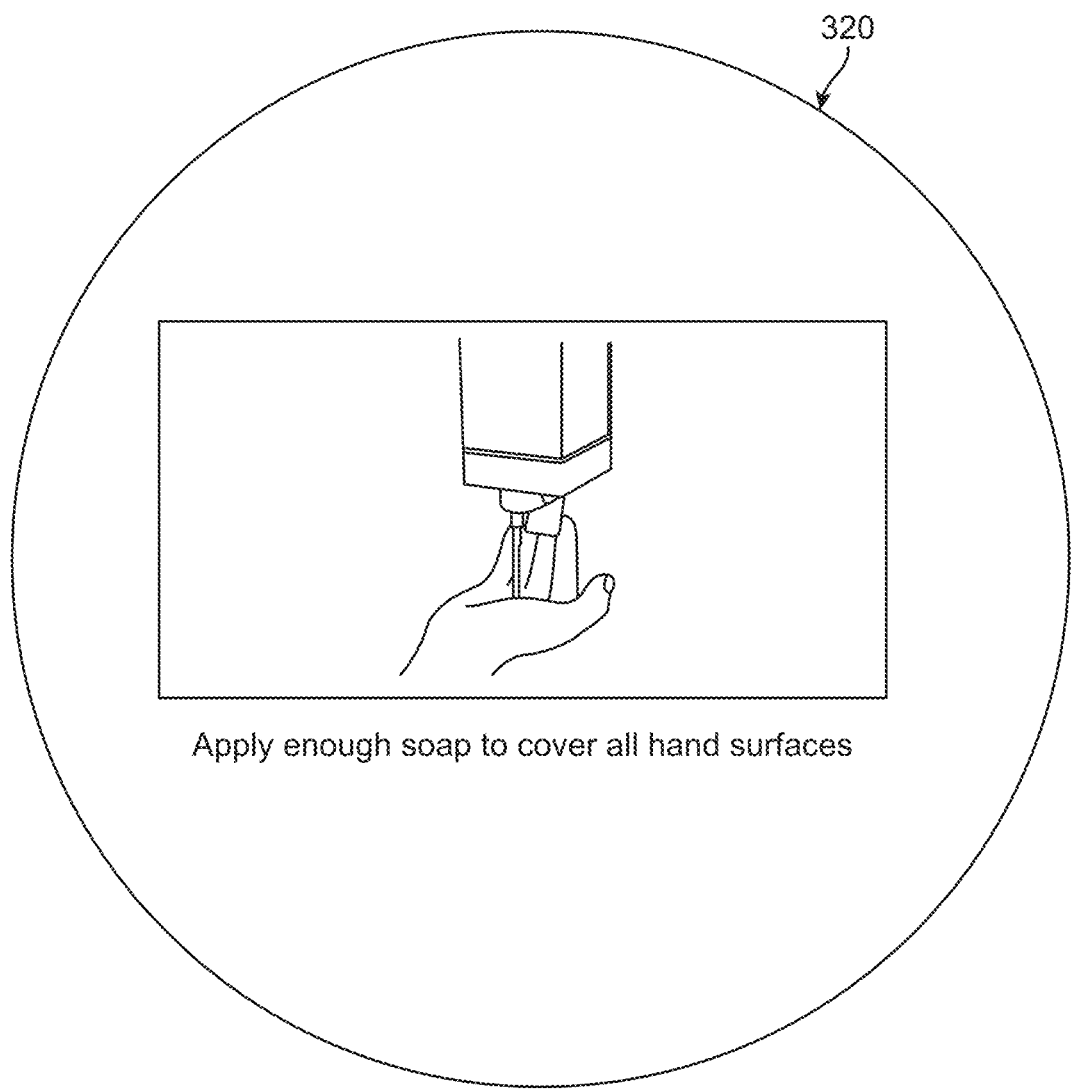
Figure 7C:
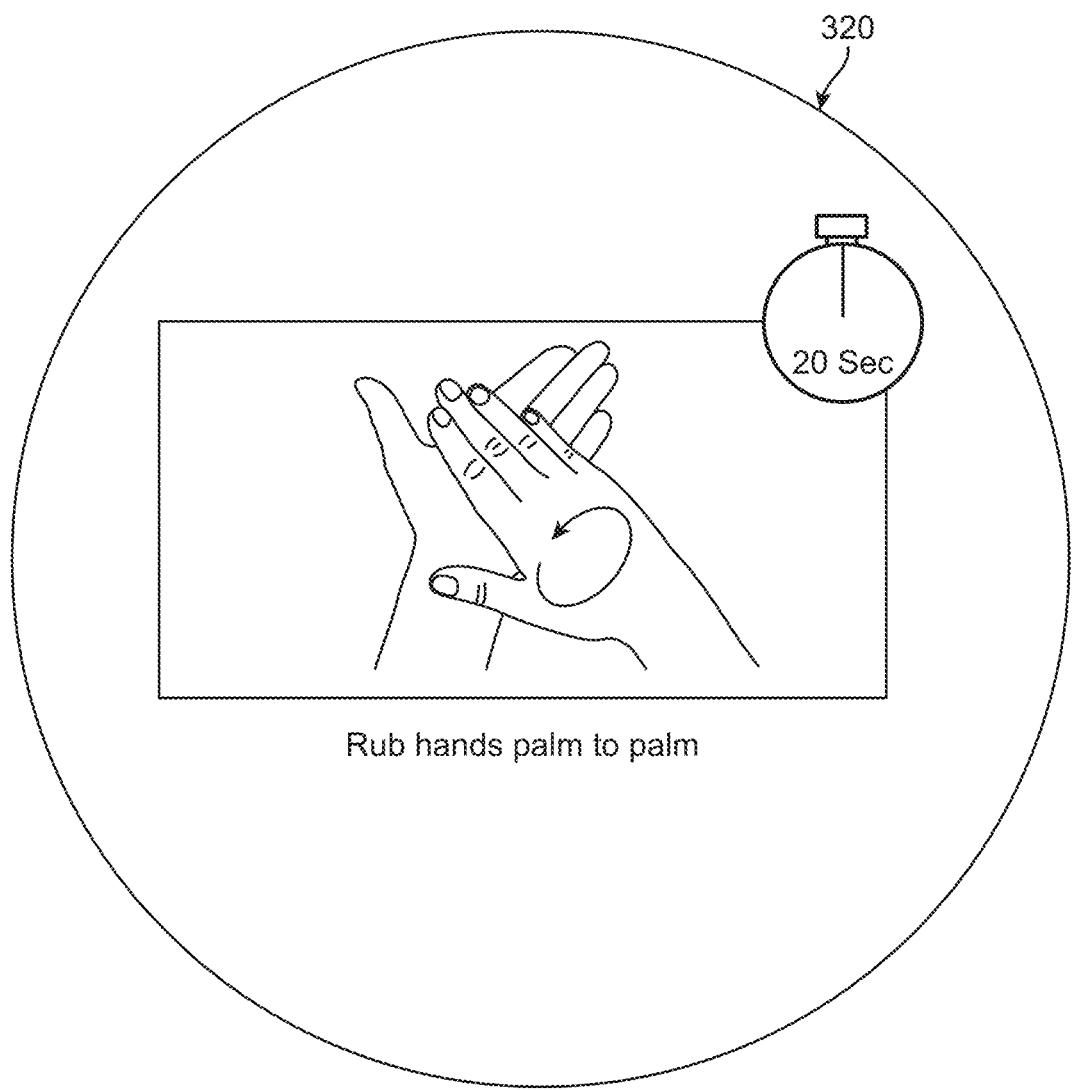
Figure 7D:
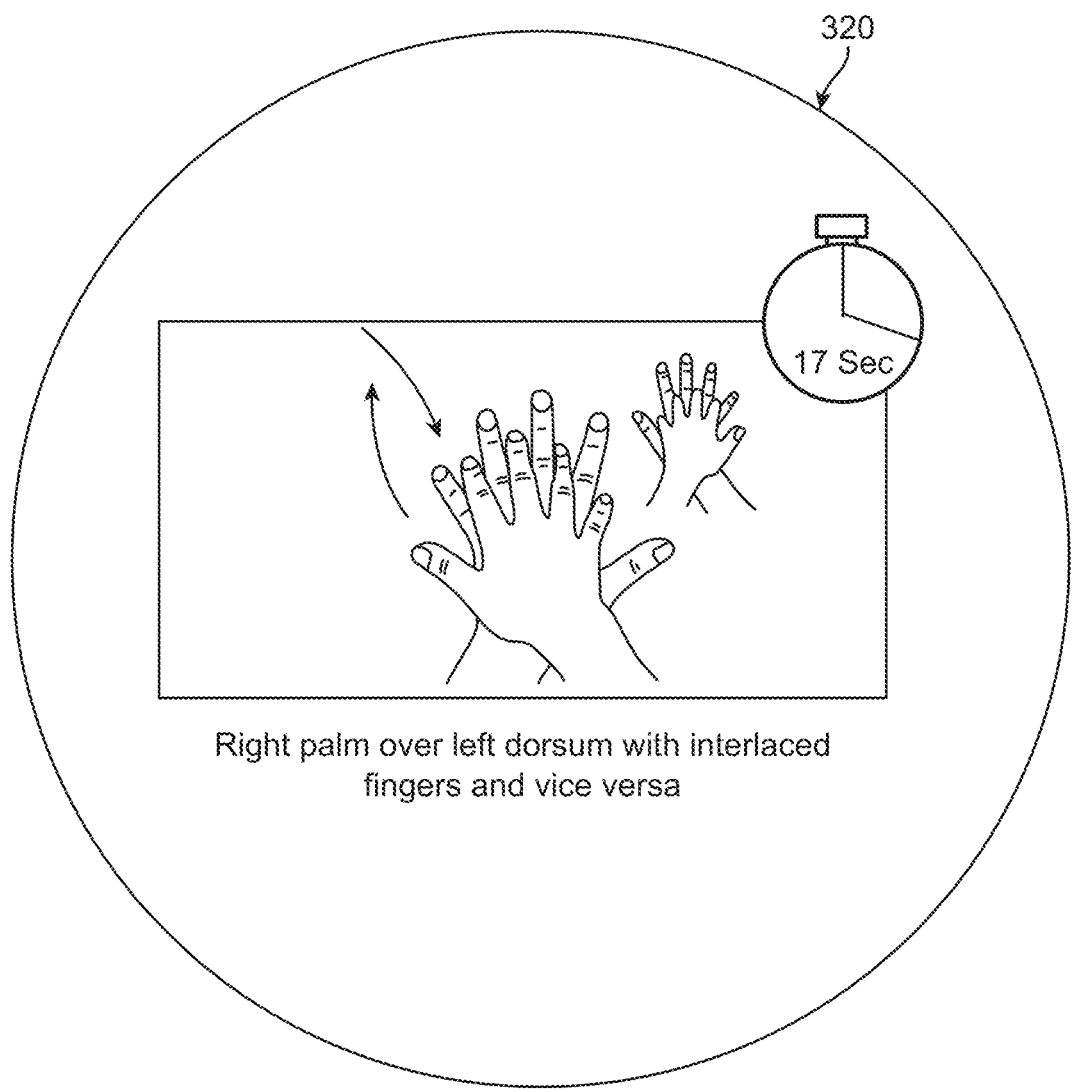
Figure 7E:
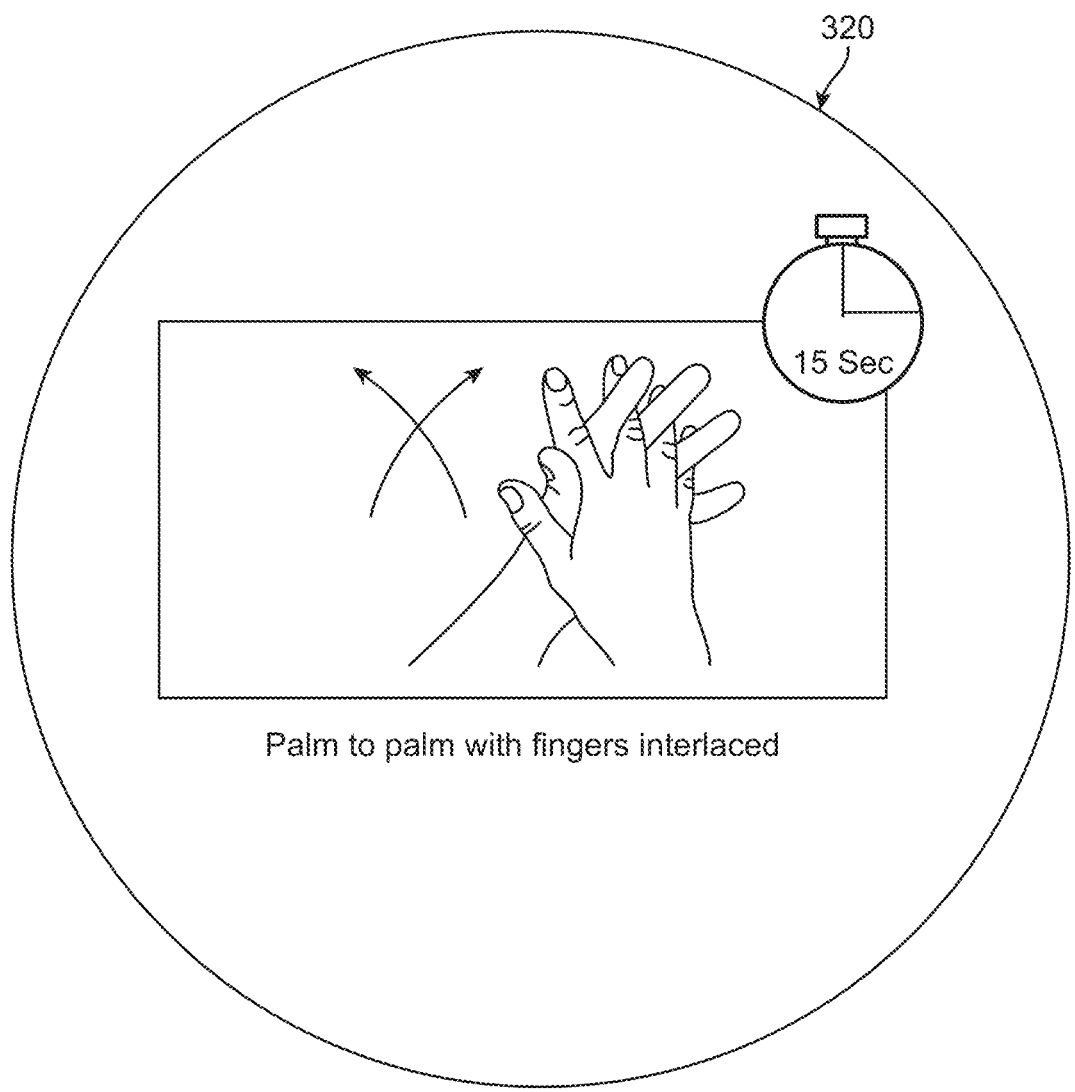
Figure 7F:
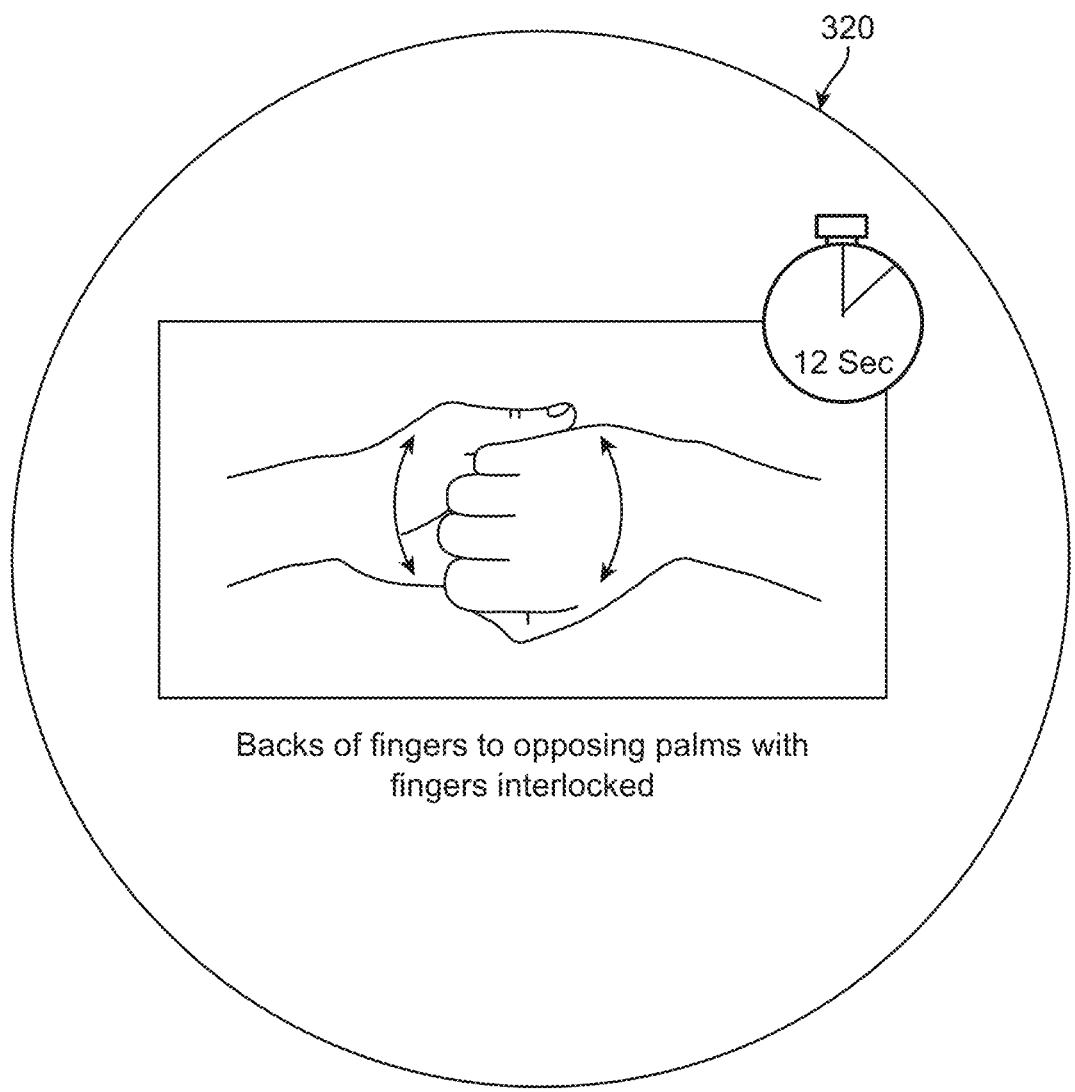
Figure 7G:
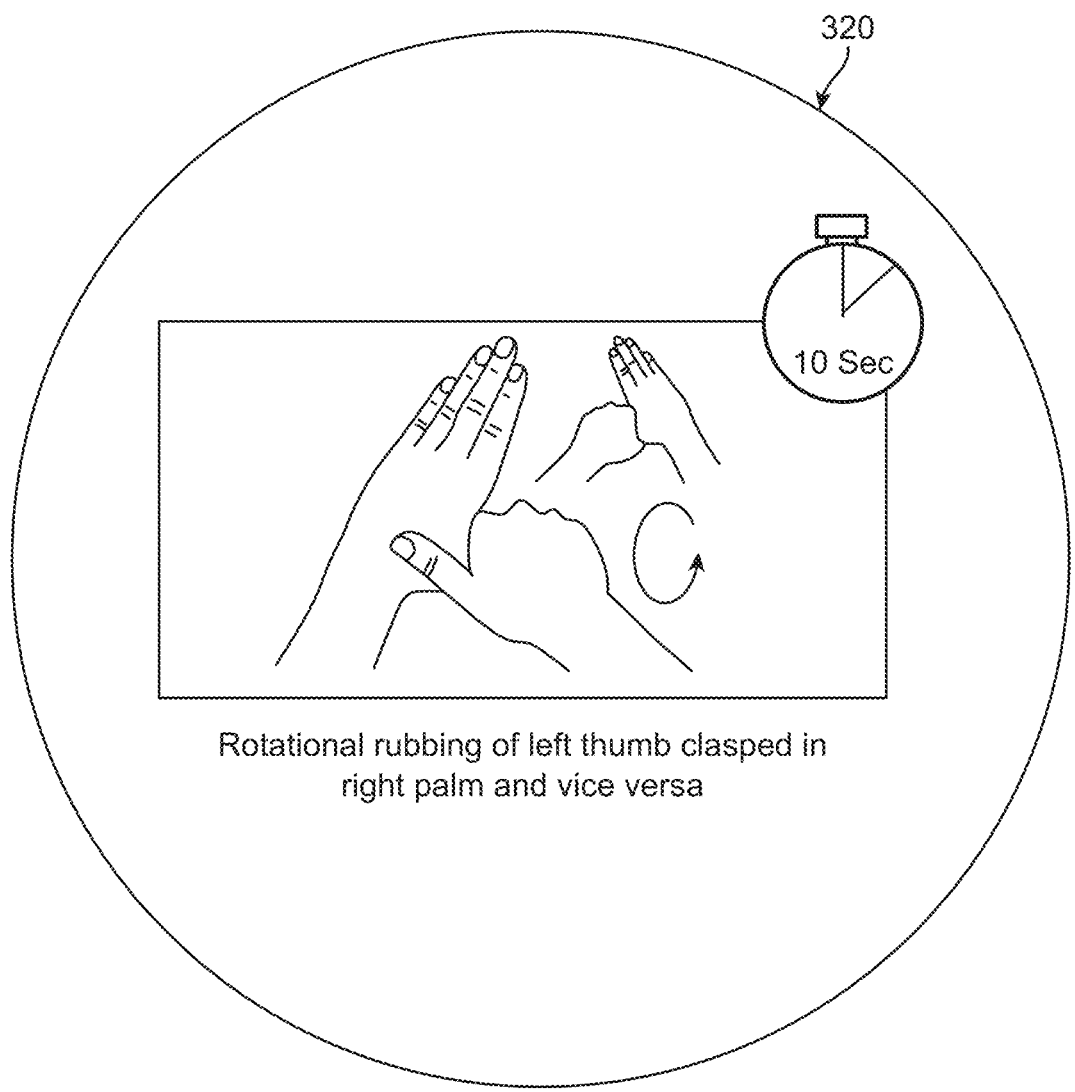
Figure 7H:
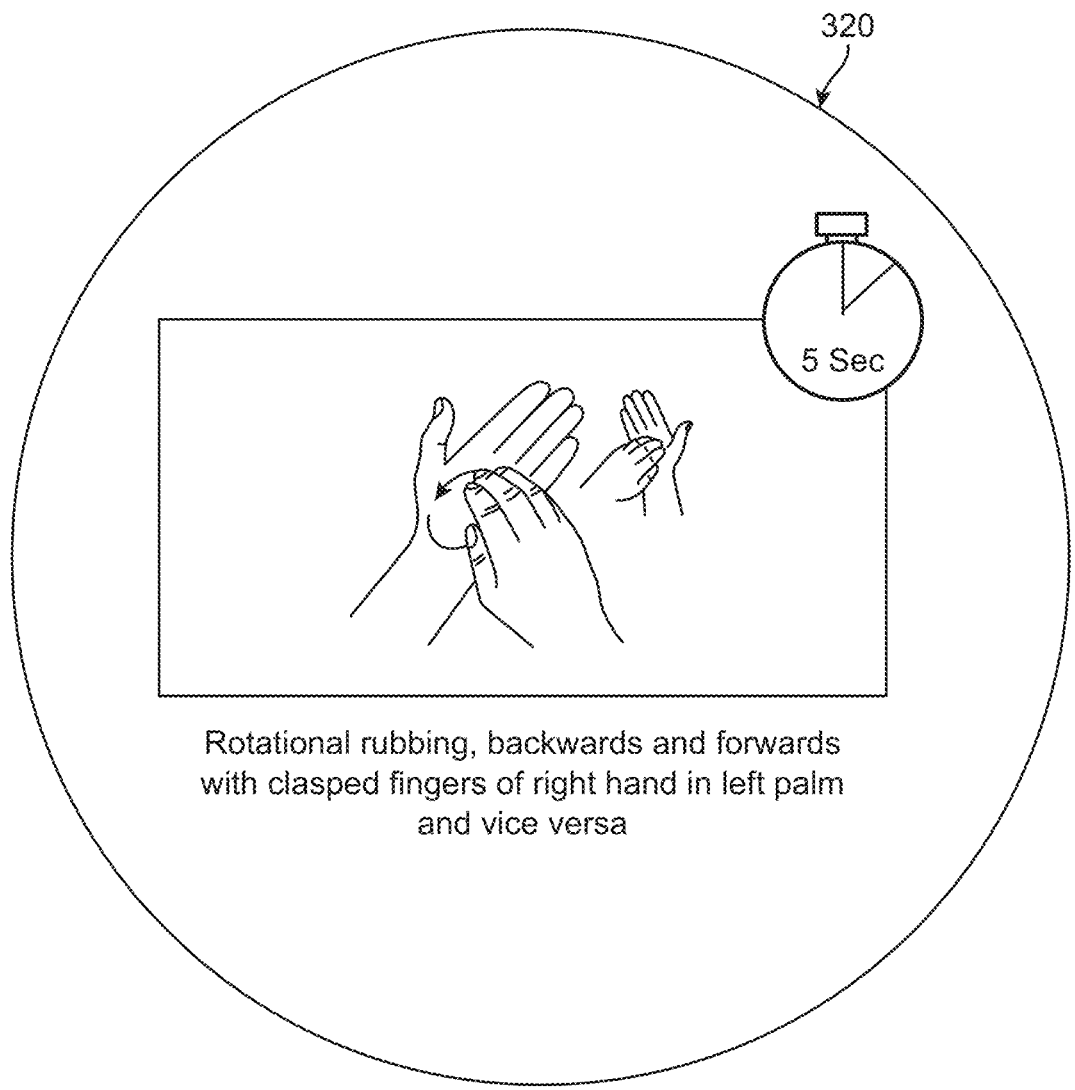
Figure 7I:
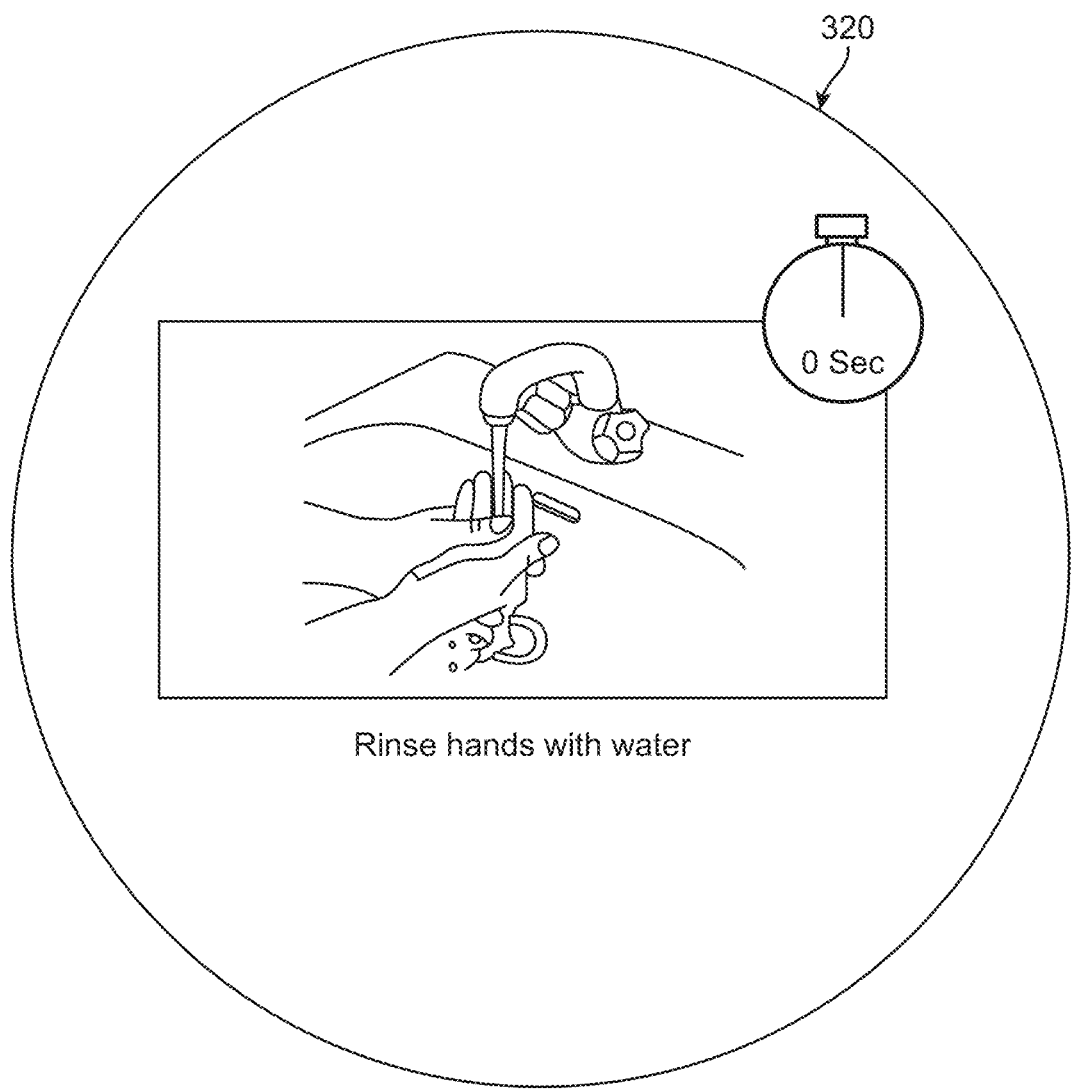
Figure 7J:
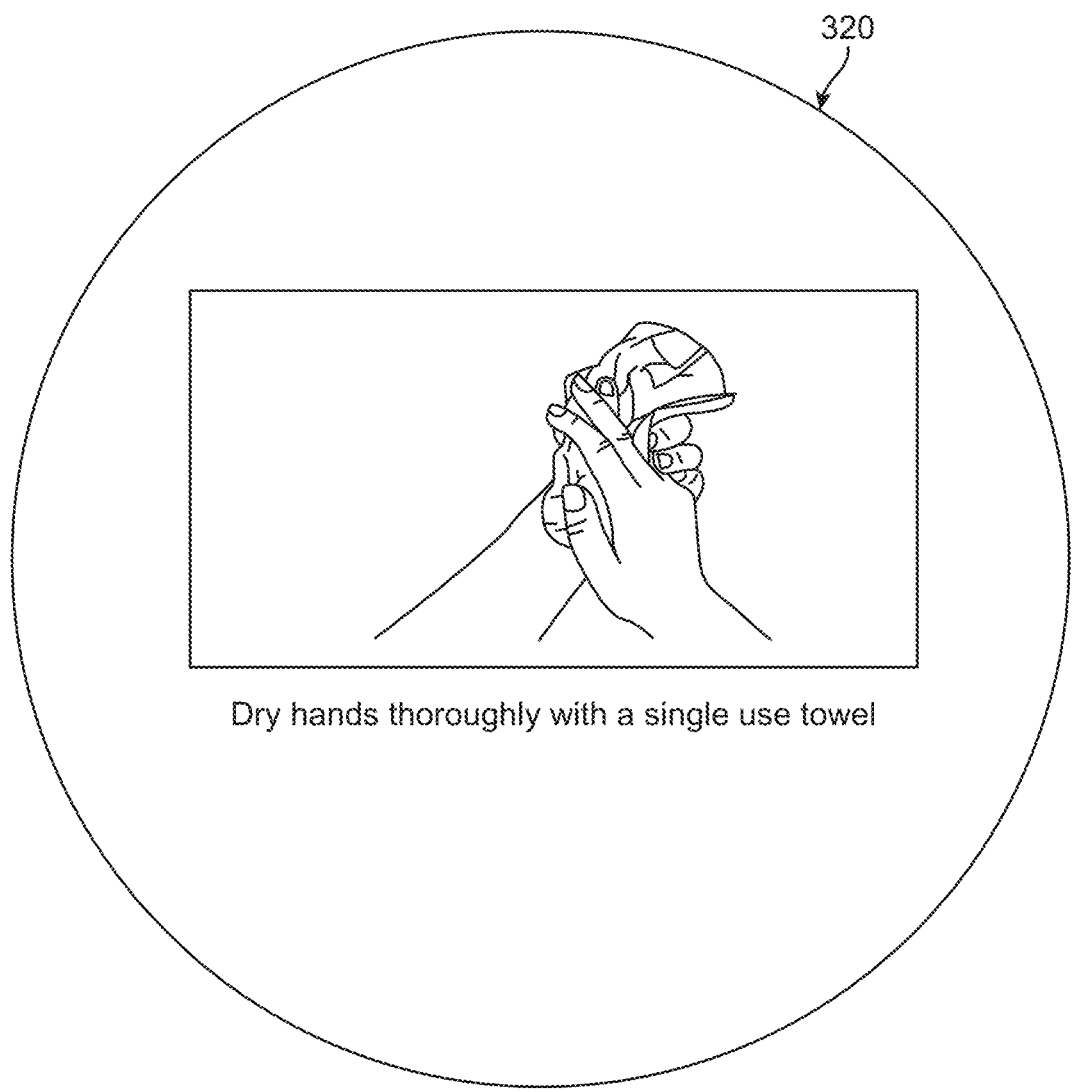
Figure 7K:
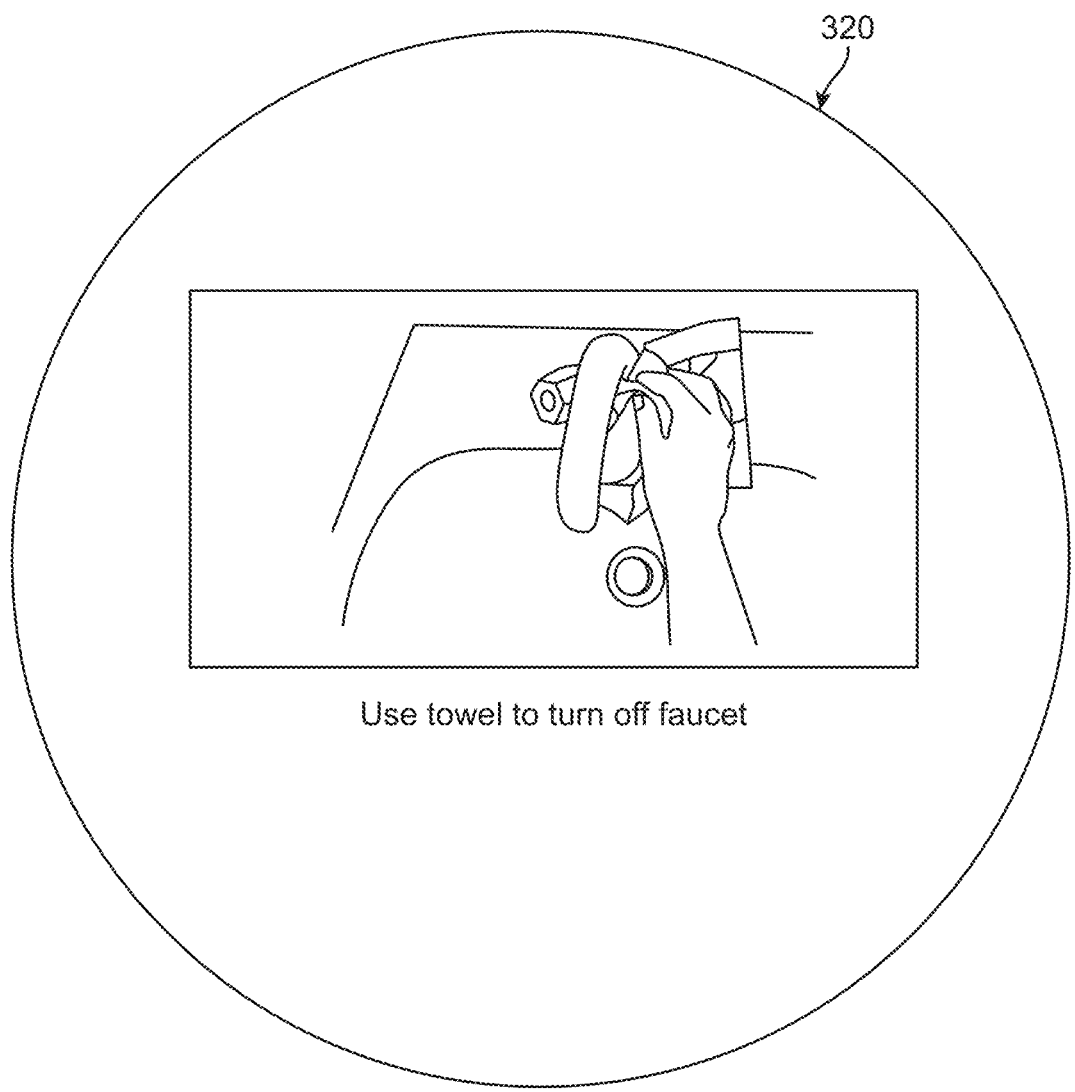
Figure 7L:
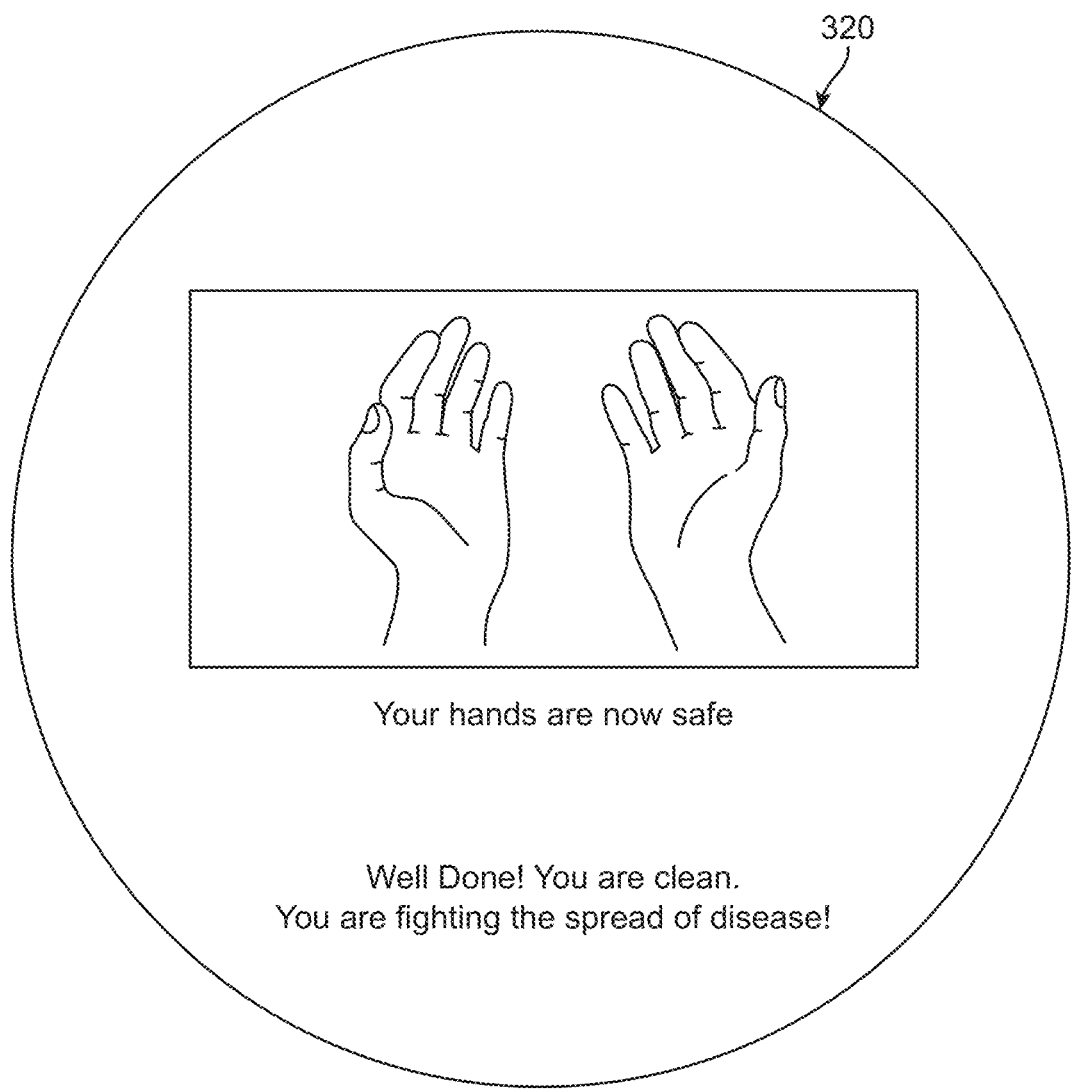
Figure 7M:
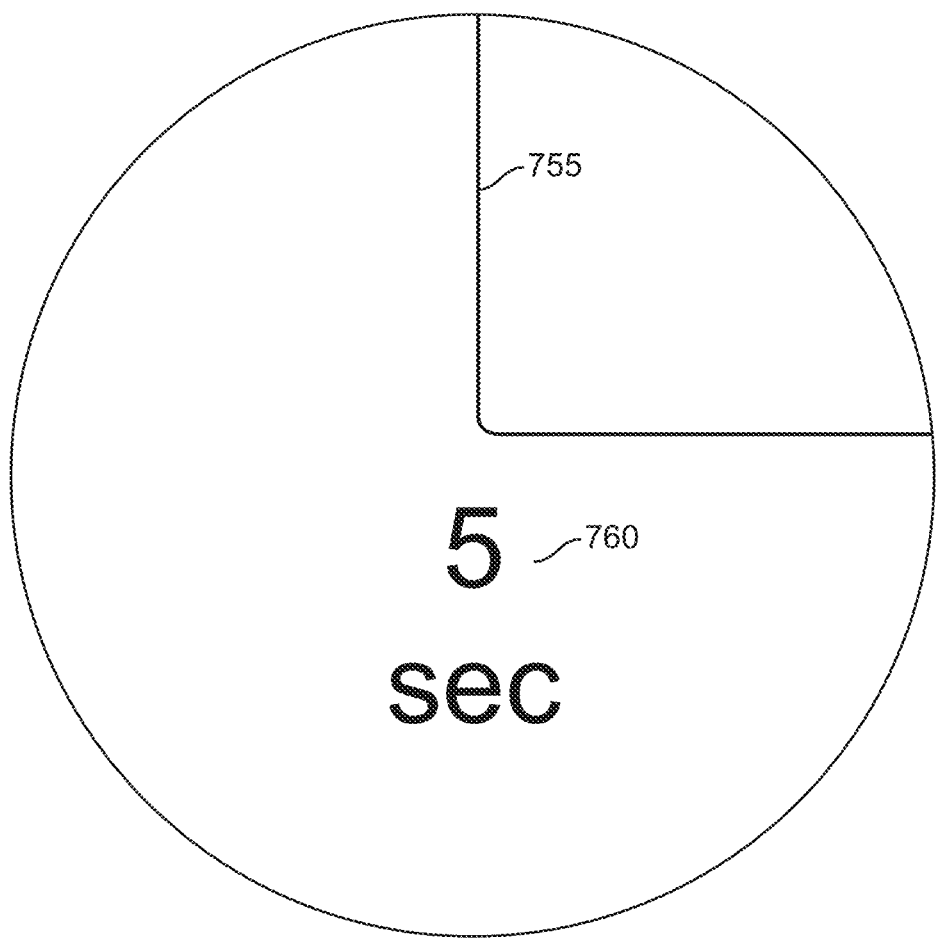
Figure 8:
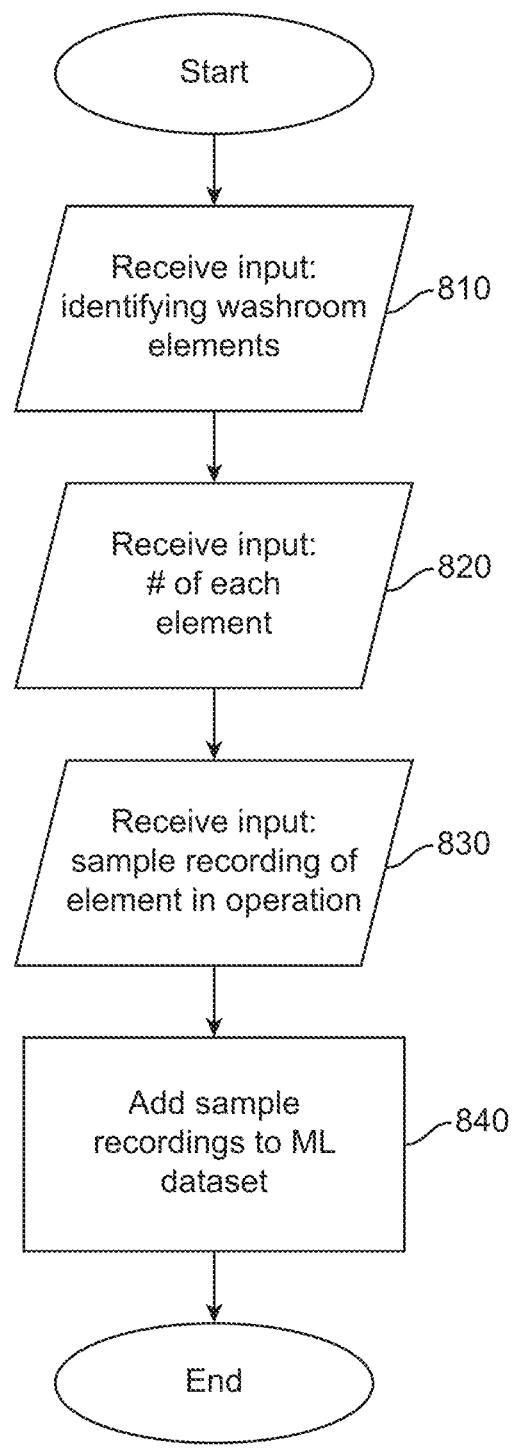
FIG. 8 illustrates a flow chart of the configuration processes of the device.

Although not shown, an MRM is used for processing motion detected in the ambient environment into triggering software in the controller/processor 330 to activate certain responsive outputs by device 300, including but not limited to the informational displays (as shown in FIGS. 7a-7m) via the video output device 320 and/or audio output device 315. Data associated with motion detected by the motion detector capture device 305 is input for the MRM. The MRM may include a machine learning classifier system configured to recognize different motions found in the washroom. MRM may store the motion in motion storage (not shown) to improve the device's 300 motion recognition quality. Set-up of the ML implementation for enhancing motion recognition would include a dataset of thousands of recordings of different motions commonly found in and around the washbasin area. As shown in FIG. 8 (to be described in later detail), device 300 is preferably initialized during the set-up with motions commonly found in a particular washroom. The device trains on a motion dataset to enhance its precision to better recognize when a certain triggering motion occurs. Device 300 could be further enhanced by the correlation and/or associations of detecting specific sounds and movements through the implementation of machine learning of recognizing particular sounds and motion to trigger proactive output behavior by the device 300 to encourage hand hygiene compliance. By way of example, when the ARM recognizes the sound of the toilet flush and the MRM recognizes the motion of a user is about to exit the washroom facility without the ARM recognizing the sound of water at the sink before the attempted exit, these conditions trigger software in the processer 330 to activate audio and/or visual reminder to "Wash Your Hands". The reminder may also be triggered at a second device in communication with a first device. The second device may be configured to include a limited set of componentry found in the first device.

Privacy

There is a natural expectation by users of privacy and anonymity in many private environments—especially a washroom environment. Naturally, the use of any electronics in such environments may raise escalate the privacy concern. One aspect of the present disclosure is the gathering and use of data available from various sources including the ambient environment where the device 300 is situated to classify sounds and motions, and to improve the accuracy of classifying those sounds and motions as being hand hygiene-related activities. When not permitted to do so under applicable rules and regulations, the present disclosure, in one aspect, mitigates the risk of obtaining personally identifiable information (PII) of a user in the ambient environment of the device 300. In another variation of the present disclosure, it contemplates that in some instances, this gathered data may include PII data that uniquely identifies or can be used to contact or locate a specific person. The present disclosure recognizes that the use of such personal information data, in the present technology, can be used to the benefit of users. For example, the personal information data can be used to provide customized learning opportunities/feedback to a specific user to better adhere to acceptable hand hygiene protocols. For a specific user, the disclosure considers reducing expectations for a user that has historically was the least compliant user out of a larger known set of users. In that instance, the system outputs hand hygiene compliance that would gradually bring the particular user to full compliance over a longer period of instances where the device recognizes the user.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by the entity that installs the present device and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA);

whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of continuous audio collection ("always listening") and storage of historical sound data, the present technology can be configured to allow users to select to "opt in" or "opt out" of participation in the collection of personal information data during registration for services or anytime thereafter.

Moreover, in an embodiment, personal information data should be managed and handled in a way to minimize risks of unintentional or unauthorized access or use. Risk can be minimized by limiting the collection of data and deleting data once it is no longer needed. In one variation, the present disclosure utilizes digital obfuscation to abstract away any actual or potential PII of users using privacy-enhancing technology (PET). PETs are a broad range of technologies (hardware and/or software) that are designed to extract data value in order to unleash its full commercial, scientific and social potential, without risking the privacy and security of this information. Two major types of PETs are cryptographic algorithms and data masking techniques. Cryptographic algorithms include homomorphic encryption, secure multiparty computation (SMPC), differential privacy, and zero-knowledge proofs (ZKP). Data masking techniques include obfuscation, pseudonymization, data minimization and communication anonymizers. Any of the aforementioned PETs may be utilized in the present disclosure.

Figure 3B:
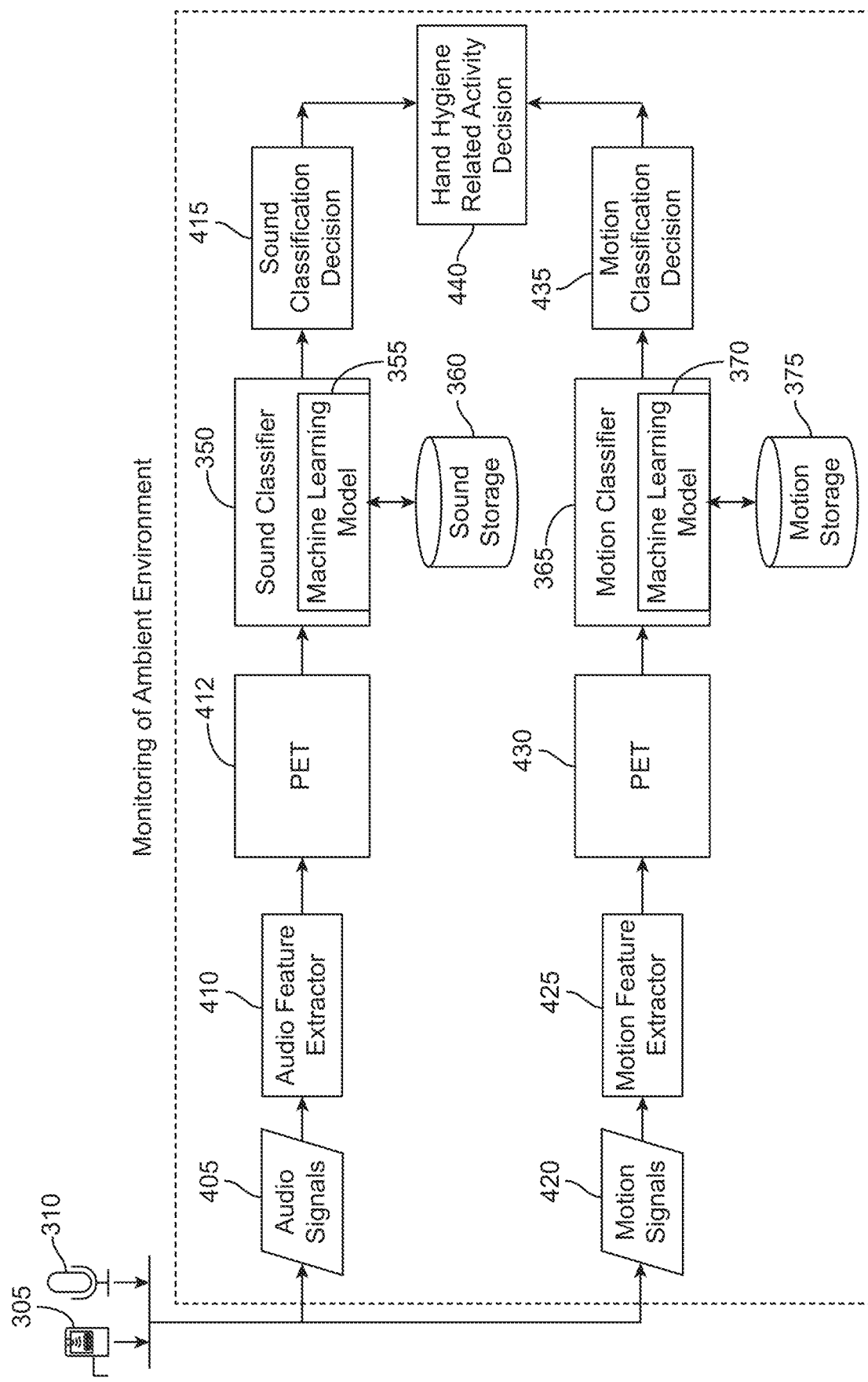
FIG. 3b illustrates a block diagram of the monitoring of an ambient environment.

The ARM and MRM are programmed to filter any PII data artifacts captured in the raw audio and motion input by utilizing a PET (see discussion in FIG. 3b regarding the PET component 410 and 430). Component choice may help mitigate these risks. For example, using LIDAR sensor technology as part of the motion detector capture device 305 can be set to remove all PII. A point cloud sensor data, generated by the LIDAR, is inherently anonymous to protect users' privacy while also giving the device's MRM a high-resolution image to work with. To add layer of privacy, the device uses edge computing systems to process data in the field and pass on anonymized object data to the cloud-based networks only if necessary. In addition, and when applicable, data de-identification can be used to protect a user's privacy. De-identification may be facilitated, when appropriate, by removing specific identifiers (e.g., name, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, sound and motion classification can be performed based on non-personal information data or a bare minimum amount of personal information.

FIG. 3b

Monitoring of Ambient Environment

With reference to FIG. 3b, a block diagram representing the logical, algorithmic components the device will execute when monitoring the ambient environment for hand hygiene non-compliance. It is be understood; the reverse could be monitored—namely, monitoring the ambient environment for hand hygiene compliance. For brevity, the former is what is described herein. FIG. 3b shows a monitoring system receiving audio signals 405 from at least one audio sensor, such as a microphone, 310 and motion signals 420 from at least one motion detection sensor 305. The monitoring system comprises an Audio Recognition Module for classifying audio signals and a Motion Recognition Module for classifying motion signals according to one aspect of the present disclosure. Although shown in FIG. 3b as a single component, the system can include a plurality of feature extractors 410 or one or more feature extraction or detection components or modules that perform specific signal processing on received audio signals 405 to determine specific features, aspects, or characteristics thereof. The plurality of feature extractors 410 can apply algorithms or modeling (e.g., including machine learning modeling) to the audio signals (e.g., components thereof) to determine their specific features. The plurality of feature extractors 410 may include a sound class feature extractor, a directional information feature extractor, and a distortion feature extractor (not shown). Audio feature extraction may utilize one or more models commonly used in NLP (Natural Language Processing) or ASR (Automatic Speech Recognition) such as Artificial Neural Network (ANN), Gaussian Mixture Modelling (GMM), or Support Vector Model (SVM). The mentioned models and similar models may be used for audio signal processing and other feature extractions to determine key audio information such as MFCC (Mel-Frequency Cepstral Coefficients), filter banks, sampling frequencies, amplitude, Fourier transform, and more for the purpose of classifying audio signals. The use of publicly available tools and datasets, such as Librosa, may be used to conduct an in-depth audio analysis and digital signal pre-processing.

In one variation, the sound class feature extractor can apply one or more algorithms or models to the audio signals 405 to determine one or more sound classes present in one or more of the audio signals 405. The sound classes can include a specific sound type, such as speech, music, laughter, sounds made by particular objections (e.g., toilets flushing or other exemplary sounds set out in FIG. 4a), etc., or other types of sounds. In addition, the sound class feature extractor can determine whether the audio signals include multiple sound classes or whether the sound classes vary or change over time.

The sound class feature extractor itself can include one or more machine learning models or other (semi-)supervised learning or statistical models that are trained or calibrated to determine the different sound classes, respectively, based on the audio signal 405 as its input. For example, a data corpus, including various ground truth-labeled sounds of different sound classes, is collected. The data corpus can then be partitioned or otherwise separated into training sets and testing sets. The machine learning model is trained or calibrated to determine the sound class or sound classes using the training set. The accuracy of the machine learning may then be determined using the testing set, e.g., to determine whether the machine learning model assigns classes to signals of the testing set at a threshold rate or level of accuracy.

Further, in one variation, a plurality of feature extractors 410 can include a directional feature extractor (not shown). The directional feature extractor can perform signal processing on one or more of the audio signals 410 to determine spatial signatures or characteristics, e.g., there is a dynamic sound source vs. a static sound source recorded in the audio signals 410. For example, an audio signal that contains a recording of a sound emitted from a stationary device (e.g., toilet, sink water faucet, shower, bathtub, or ceiling fan) may have stationary or static spatial characteristics, but an audio signal from a sound of a person talking or yelling may have dynamic spatial characteristics due to the person turning their head or walking around (while talking). The directional feature extractor can process the audio signal to determine directional characteristics of the sound, such as a specific direction, time of arrival, angle, etc. For example, sounds emitted from such stationary devices will generally be received from the same position and will have the same or similar directional characteristics reflected in the audio signal. Still further, the plurality of feature extractors 410 can include a distortional feature extractor and other types of feature extractors (while still remaining within the scope of the present disclosure).

The ARM may include a classifier 350, employing a neural network or other suitable machine learning model 355, whose output may be a sound classification that classifies the sound as an audio trigger vs. audio non-trigger. The classifier 350 receives the plurality of features and previously stored sound metadata in sound storage 360. For example, these features and historical data can be used as inputs to the neural network, deciding whether the sound is a recognized trigger audio event. In some cases, the decision made by the classifier 350 (to determine whether the audio signal is from a trigger sound vs. non-trigger sound) can be based on just the historical data without relying upon an output of the neural network (e.g., if the current audio signal has substantially similar features or the same feature vector as those of a previously classified audio signal.)

As shown in FIG. 3b, the system may include a similar arrangement of components arranged for classifying motion/movement signals. Motion signals generally relate to the physical movement of one or more users present in the ambient environment. The outcome from the motion-related Motion Recognition Module (MRM) has a similar goal—to classify what type of motions detected in the ambient environment is related to hand hygiene vs. those motions unrelated to hand hygiene. A plurality of motion feature extractors 425 or one or more feature extraction or detection components or modules that perform specific signal processing on received motion signals 425 to determine specific features, aspects, or characteristics thereof. The plurality of motion feature extractors 425 can apply algorithms or modeling (e.g., machine learning modeling) to the motion signals (e.g., components thereof) to determine their specific features. The plurality of motion feature extractors 425 may include a motion class feature extractor and other types of motion feature extractors (not shown). Feature extraction will require use of ML models such as PCA (Principal Component Analysis), Convolutional Neural Networks (CNN), SVM, K Nearest Neighbor (KNN), Random Forrest, or models like such. The development process of these models within the MRM may include a workflow such as loading the data, preprocessing the image, defining model parameters, and training/testing network. Point cloud segmentation may take the input form of voxels, point clouds, graphs, 2D view, and other similar networks.

In one variation, the motion class feature extractor can apply one or more algorithms or models to the motion signals 420 to determine one or more motion classes present in one or more of the motion signals 420. The motion classes can include a specific motion type, such as user exiting washroom, a user walking toward a sink area, user washing his/her hands, a user entering the washroom, user applying soap, user rinsing hands, a user activating sink faucet, user rinsing hands with water, user scrubbing hands, user deactivating sink faucet, user drying hands, etc.

The motion class feature extractor itself can include one or more machine learning models or other supervised learning or statistical models that are trained or calibrated to determine the different motion classes, respectively, based on the motion signal 420 as its input. For example, a data corpus, including various ground truth labeled sounds of different motion classes, is collected. The data corpus can then be partitioned or otherwise separated into training sets and testing sets. The machine learning model is trained or calibrated to determine the motion class or motion classes using the training set. The accuracy of the machine learning may then be determined using the testing set, e.g., to determine whether the machine learning model assigns classes to signals of the testing set at a threshold rate or level of accuracy.

The MRM may include a classifier 365 employing a neural network or other suitable machine learning model 370, whose output may be a sound classification that classifies the sound as an audio trigger vs. audio non-trigger. The classifier 365 receives the plurality of features and previously stored motion metadata in motion storage 375. For example, the neural network receives as inputs features and historical data, which can decide whether the motion is a recognized trigger motion event. In some cases, the decision made by the classifier 365 (to determine whether the motion signal is from a trigger motion vs. non-trigger motion) can be based on just the historical data without relying upon an output of the neural network (e.g., if the current motion signal has substantially similar features or the same feature vector as those of a previously classified motion signal.)

Based on the sound classification decision 415 and the motion classification decision 435, a decision is made whether the sensor data from the monitored ambient environment is non-compliant hand hygiene-related activity. This determination may be based on a plurality of conditions based on sound and/or motion triggers detection. Generally, if a first condition is satisfied and a second condition is satisfied, then a determination is made whether or not it is non-compliant hand hygiene-related activity.

By way of example, let's assume the device has been configured to operate in a washroom. If the sound classification determines that the sound processed is that of a toilet flush, and if the motion classification determines a subsequent motion detected in the ambient environment is that of a user tending to exit the washroom (with a further confirmation that the sound classifier did not detect any sound of water flowing from the sink faucet before the imminent exit), the hand hygiene-related activity decision 440 would conclude that this activity is that of hand hygiene-related activity particularly that of non-compliance to acceptable hand hygiene.

By way of another example, if the sound classification determines that the sound processed is that of a faucet running water into a sink, and if the motion classification and/or sound classification determines soap dispenser use was not detected, the hand hygiene-related activity decision 440 would conclude that this activity is that of hand hygiene-related activity particularly that of non-compliance to acceptable hand hygiene. The device 300 takes output action indicative of remedying the non-compliance.

The device 300 is programmed for this sound-to-motion correlation or mapping for various permutations of trigger sounds and triggers motions to determine whether hand hygiene activity has occurred. Naturally, a multitude of conditions are possible given the exemplary sound and motion triggers described herein. It is naturally within the scope of the present disclosure that the determination could be either that hand hygiene is complied with, or that hand hygiene has not to be complied with. In ambient environments where multiple users are present at any given time, a temporal user identifiable data distinguishes each user present to ensure that the device reacts (or outputs) according to that particular user's hand hygiene compliance.

FIG. 3b shows illustrate the PET components 412 and 430, which removes one or more data artifacts that may be personally identifiable information (PII) of a user. Although shown as a single component, the present disclosure may include instances of the PET 412 component repeated in different stages of processing the user's data information. This equally applies to the components associated with the motion recognition module.

Figure 5A:
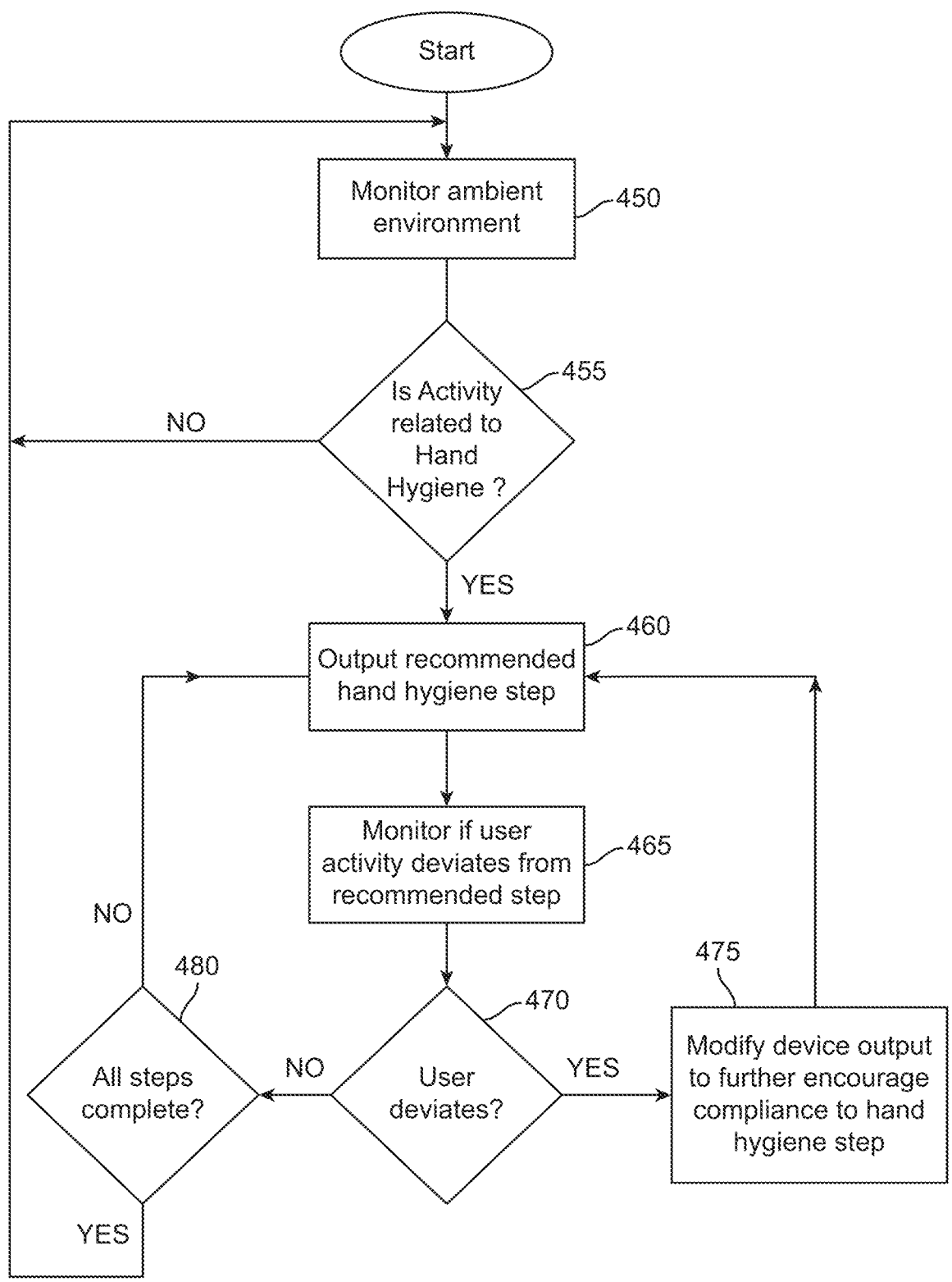
FIG. 5a illustrates an exemplary flow chart of the device in operation determining whether user activity is related to hand hygiene.

FIGS. 5a and 4b

FIG. 5a illustrates a flow diagram of an example process for addressing a non-compliance to a handwashing-related activity using the system set out in FIGS. 3a and 3b, according to one embodiment. FIG. 5a is intended to disclose algorithms or functional descriptions that may be used as a basis of writing computer programs to implement the functions that are described herein, and which cause a computer to operate in the new manner that is disclosed herein. Further, FIG. 5a is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process set out in FIG. 5a may be performed in any order, and is not limited to the order shown in FIG. 5a. The procedure starts with the device monitoring the ambient environment for user activity 450. The monitoring step may utilize the process and componentry set out in FIGS. 3a and 3b. A determination is made whether or not the activity is related to handwashing or hand hygiene 455. If the activity is related to hand hygiene, the process then presents a recommended handwashing step/hand hygiene step 460. Again, the process returns to monitoring the user's activity 465, and a determination is made if the user deviates from acceptable hand hygiene protocol 470. If there is a deviation detected at step 470, the process proceeds to present output to the user to further encourage compliance to an acceptable hand hygiene protocol 475.

FIG. 4b lists examples of how the device modifies its output according to one or more embodiments. Depending on the recommended step and the type of deviation, reinforcement may include outputting the importance of the particular step's compliance to ensure good hand hygiene; outputting the deviation in such a manner to "call out" the deviation to the user and to others in the washroom; repeating the display of the recommended step with additional urgency to comply with the step; or some combination thereof. When the device 300 detects that the user appears to not comply with a recommended hand wash, the device 300 highlights non-compliance to the user by the use of an audio warning, a visual warning, or some combination thereof. The audio warning could be a voice recording, "You are not quite done your handwash!" or some suitable equivalent that may reference the type of non-compliance. If the process determines the user has complied with the recommended step at step 470, the logical procedure determines whether all hand hygiene steps are complete 480. If no, the appropriate recommended handwashing step is outputted. If yes, the process returns to monitor the ambient environment for the next user 450. Before this, a variation of the present disclosure includes recognizing the user's hand hygiene compliance and/or feedback on improving the user's hand hygiene compliance. The device then returns to monitoring the environment to detect the next user. The steps set out in FIG. 5a may be performed in any order or simultaneously, and the steps of detecting the user and/or detecting whether the user deviates may be continuous. Although shown sequentially, these steps may be performed in any order or simultaneously, and at least detecting the user may be continuous.

Other remediation is available should the user fail to comply with hand hygiene compliance. For example, the user ignores all recommended steps to comply, a notification is sent to janitorial staff to clean door handles at that bathroom location. This especially useful a work environment where janitorial staff are available for this remedial effort to mitigate the risks associated with non-compliance by users.

FIG. 5b

Figure 5B:
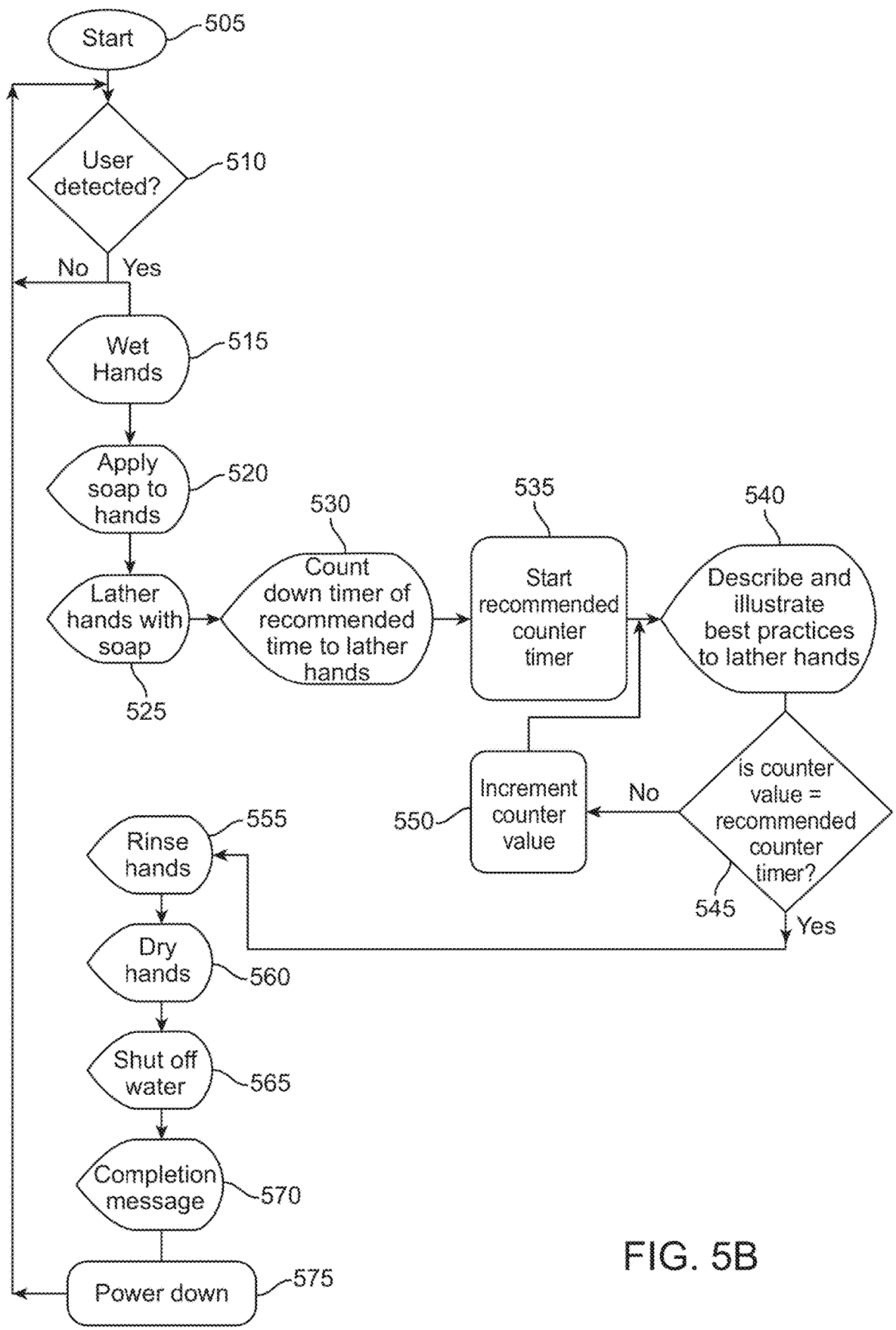
FIG. 5b illustrates an exemplary flow chart of the processes of a first embodiment of the device in operation.

FIG. 5b is a flow chart illustrating an example algorithm for encouraging compliance for proper handwashing to be executed on device 300, as shown in FIGS. 3a and 3b. At the start 505, the system monitors the environment. Monitoring may include motion sensing. Upon a user approaching the device, which is preferably installed near the sink, the device will detect the user 510 and activate an output. Although shown sequentially, these steps may be performed in any order or simultaneously, and at least detecting the user may be continuous.

Upon this activation, the device, in an embodiment, alerts the user of the device's 300 presence by displaying a visual message, an audio message/alert, or a combination thereof to the user. In another embodiment, the message is the statistics of those users doing a proper hand wash at the sink. For example, "Over 100 people followed the recommended handwashing protocol to ensure a healthy tomorrow. You are next!" or "Every employee has washed his/her hands today, you are next!" In this manner, the device 300 acts to influence the user's behavior to comply with better hand hygiene through a real-time reminder to wash his/her hands.

In this embodiment, the device displays the recommended steps for a proper hand wash. Each recommended handwashing step is displayed. In an alternative embodiment, the device also outputs a voice-over to reinforce each step displayed. Regarding FIG. 5, the recommended handwashing step of wetting the hands is displayed 515 on the device's display. Next, the recommended step of applying soap is displayed 520 on the device's display. After that the recommended step of lathering/scrubbing the hands with soap is displayed 525 on the device's display. The message includes a countdown for hand lathering/scrubbing for a recommended period 530 is presented to the user.

In different embodiments, the period 530 may vary depending on the current public healthcare guidance. For example, in one embodiment, the period is twenty (20) seconds. In another embodiment, the period is fifteen (15) seconds. The configuration stage sets the recommended period. The algorithm starts the timer 535, and a series of best practices of proper hand lathering/scrubbing is displayed 540, and the countdown timer continues 550 until the countdown timer is complete 545. Once the recommended period of time is complete, the step of rinsing of hands is displayed 555 on the device's display. Next, the step of drying of hands is displayed 560 on the device's display. Next, the step of turning off the water is displayed 565 on the device's display. Finally, the user is congratulated with a successful completion message displayed 570. The process returns to start 505 by monitoring the arrival of the next user.

Figure 6A:
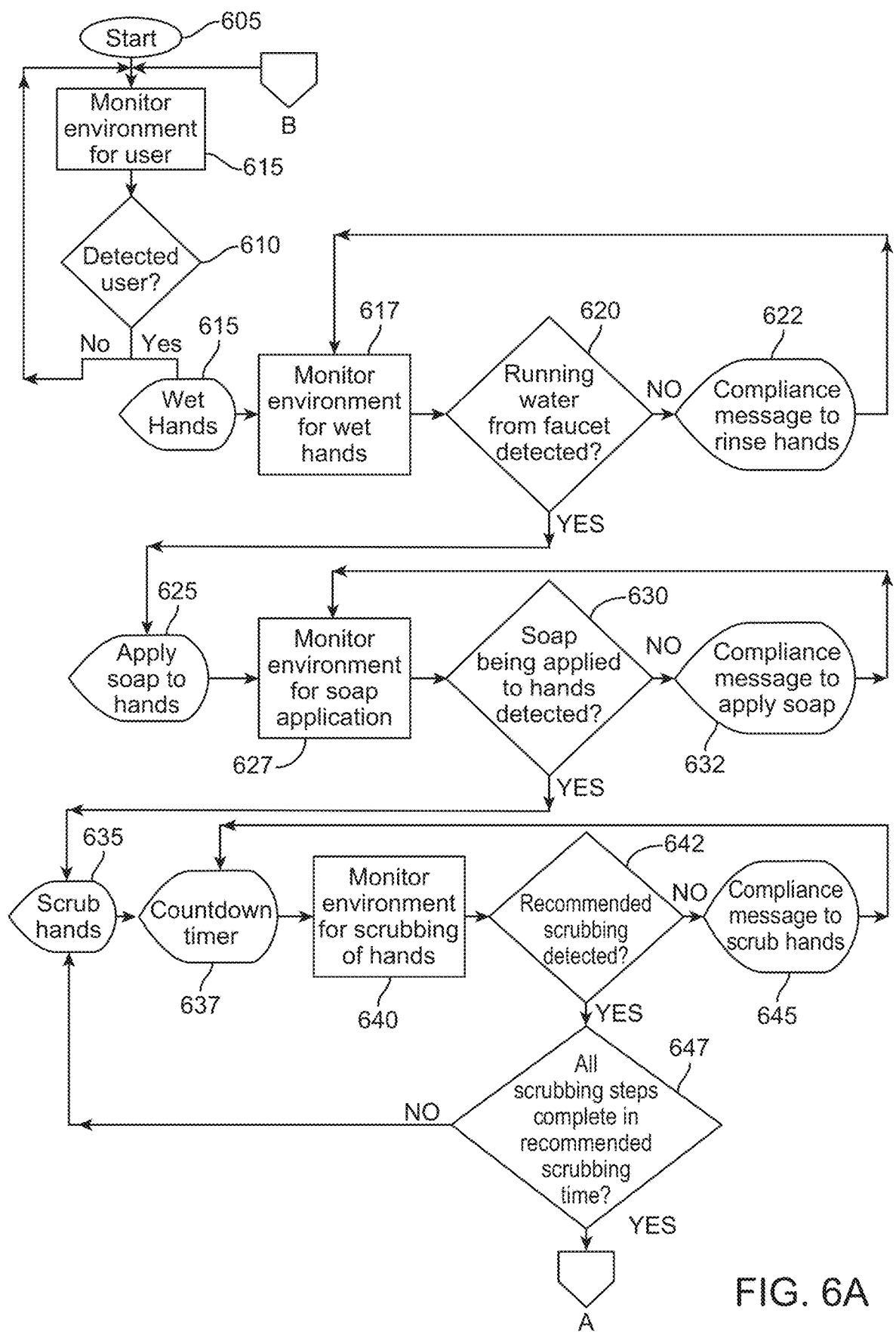
FIGS. 6a and 6b illustrate an exemplary flow chart of the processes of a second embodiment of the device in operation.
Figure 6B:
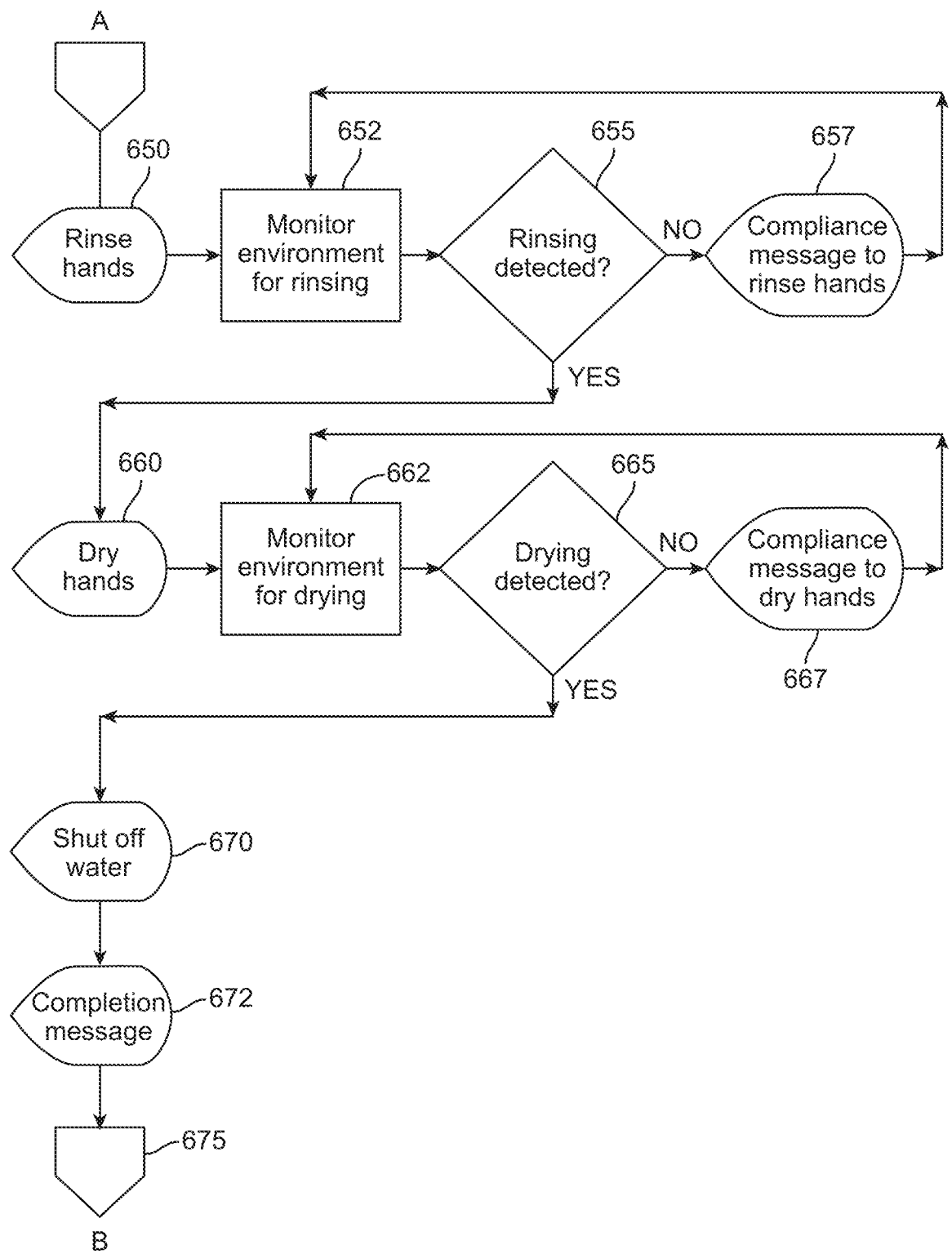

FIGS. 6*a* & 6*b*

FIG. 6*a* and its continuation FIG. 6*b* is a flow chart illustrating an example algorithm for encouraging compliance for proper handwashing to be executed on the device 300, as shown in FIG. 3*a*. At the start 605, the system monitors the washroom environment for a user 615. Upon the device detecting a user 610, it will activate its handwashing informational protocol. Although shown sequentially, these steps may be performed in any order or simultaneously, and at least detecting the user, environment monitoring, and other deviation conditions (such as non-compliance conditions as discussed below) may be continuous.

Upon this user detection, the device presents a message to encourage proper handwashing, namely wet the hands 615. Next, the device monitors the environment for running water 617. The device determines if water from the faucet is detected 620. In one embodiment, the device listens through its audio input device 310 for the sound of running water. If no water is detected, the device reinforces this step by re-announcing the user to turn on the water tap to wet his/her hands 622.

Once the device detects water, the algorithm then displays instructions to apply soap to the hands 625. Next, the device monitors the environment for the use of the soap dispenser 627. The device determines if the soap is being applied to the hands 630. In one embodiment, the device listens for the use of the soap dispenser. If no dispenser use is detected, the device announces to the user to use the soap dispenser 632. Once soap dispenser use is detected by the device, the algorithm then displays instructions to scrub the hands 635.

The device displays a countdown timer 637 and monitors the user's environment commencing the step of scrubbing 640. The device determines if the hands are being scrubbed 642. In one embodiment, the device monitors the environment near the sink to detect the scrubbing hands through sound and/or motion detection. If yes, the device determines if all recommended scrubbing steps are completed in the recommended period 647. In one embodiment, the period is twenty (20) seconds for the scrubbing steps. In another embodiment, the period is fifteen (15) seconds. Optionally, the process includes the output of a musical composition, tune or song during the time period. The recommended period is previously set during the configuration stage. If not, the device continues to display recommended scrubbing steps 635. If yes, the rinse of hands step is displayed 650 on the device's display. Next, the device monitors the environment for the rinsing step 652. The device determines if rinsing is detected 655. If this step is not detected, a reinforcement message of rinsing is displayed 657.

Next, the step of the drying of hands is displayed 660 on the device's display. The device monitors the environment for the drying of hands 662. The device determines if the step of drying of the hands occurs at step 665. In one embodiment, the device listens for the use of an air dryer or paper towel dispenser. If no hand drying is detected, the device announces to the user to dry his/her hands 667. Once the device detects drying, the algorithm continues to then display instructions to shut the water off 670.

Finally, the user is congratulated with a successful completion message displayed 672. Once the user is detected to have moved away from the sink, the device returns to a sleep state whereby the device display conserves battery power by switching off or powering down the display. This detection of the user motion is determined by the sound of water no longer pouring from the faucet; the closing of the faucet to the off position; the user's footsteps moving away from the sink area; the closing of the washroom; or some combination thereof. The process then returns to start 605 by monitoring the arrival of the next user.

FIGS. 7*a*-7*m*

Exemplary instructions for compliance with the recommended handwashing protocol are shown in FIGS. 7*a*-7*m*. These instructions are sample outputs on display 320 on device 300. Similar outputs may be provided in device 200. As shown in FIGS. 7*c*-7*i*, while the instructions are provided on how to scrub the hands correctly, a timer, preferably in the form of a countdown, is outputted to help inform and create accountability user to comply with the recommended scrubbing time duration. The graphical countdown includes a graphical element 755 that either increases or decreases according to the time remaining element 760 in the countdown as illustrated in FIG. 7*m*. The steps illustrated are preferably embodied in an animated or video format with a voice-over and/or music.

FIGS. 8, 9*a*-*c*

With reference to FIG. 8, the installation and set-up of device 300 now follow. The device 300 is preferably connected in the general vicinity of the sink area. In one variation, the display 320 is situated such that it is at a user's viewing angle when the user is washing his/her hands. One example of the installation is shown in FIG. 1*c*. Several other locations of the device may accomplish the same objective, including placing the device on the counter of the wash sink or on an opposing wall facing the sink area.

It is within the scope of the present disclosure to include a plurality of devices 300 working together collecting data that forms the learning training set for the plurality of devices. This technique is referred to as federated learning. This is a machine learning technique to train an algorithm across multiple decentralized edge devices (such as device 300) or servers holding local data samples, without exchanging them. With the decentralization of servers, the entity managing the devices and system of the present disclosure can also achieve data minimization by reducing the amount of data that must be retained on a centralized server or in cloud storage. In that variation, a first device may house a set of the components described in device 300, while a second device may have another set of components described in device 300. For example, the second device may be positioned next to the sink area, primarily acting as an output device with a display driven by the first device positioned in another area of the room through wireless communication between the first and second device.

Figure 9A:
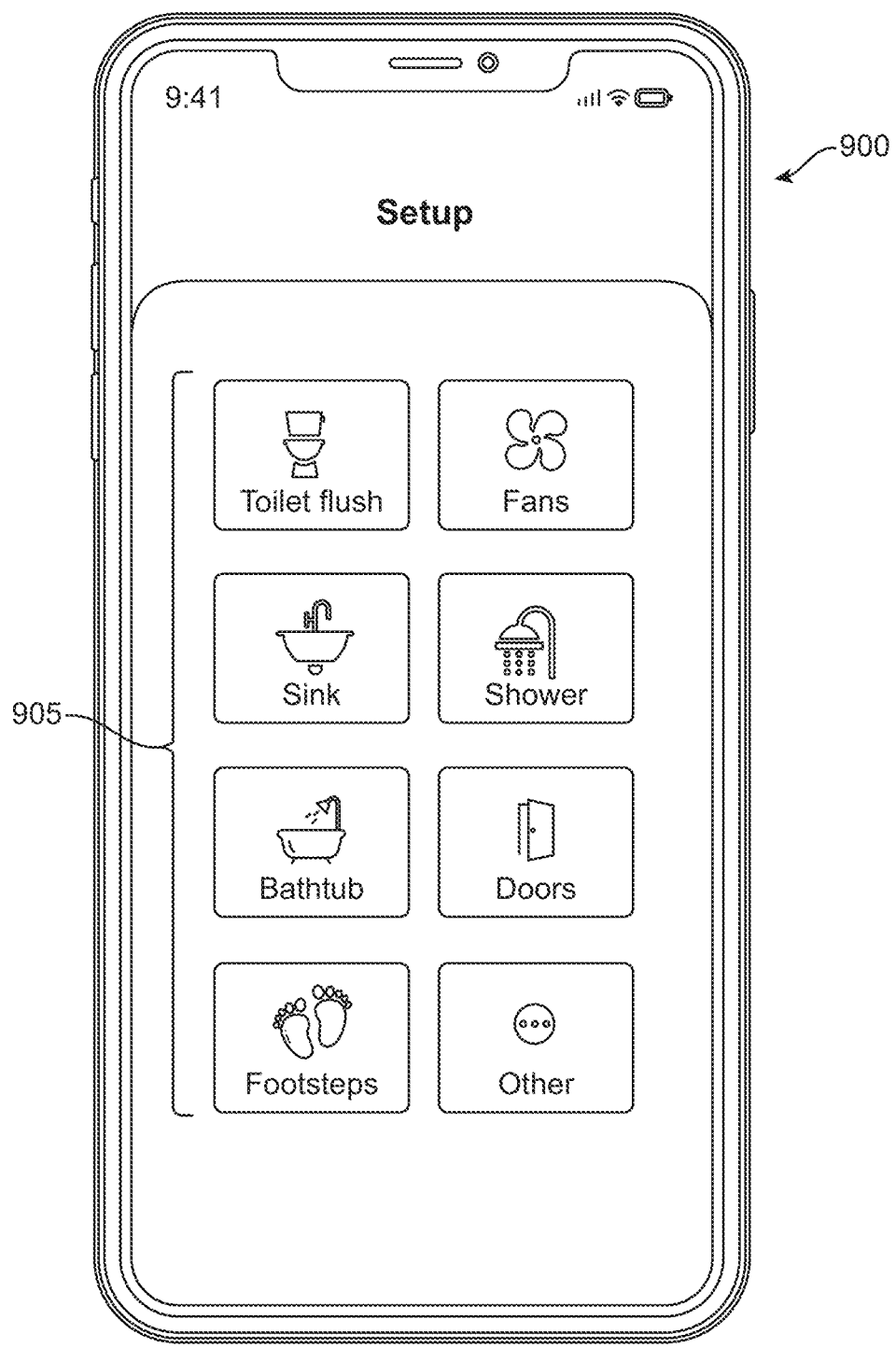
FIGS. 9a-9c illustrate exemplary user interfaces for a companion mobile app.
Figure 9B:
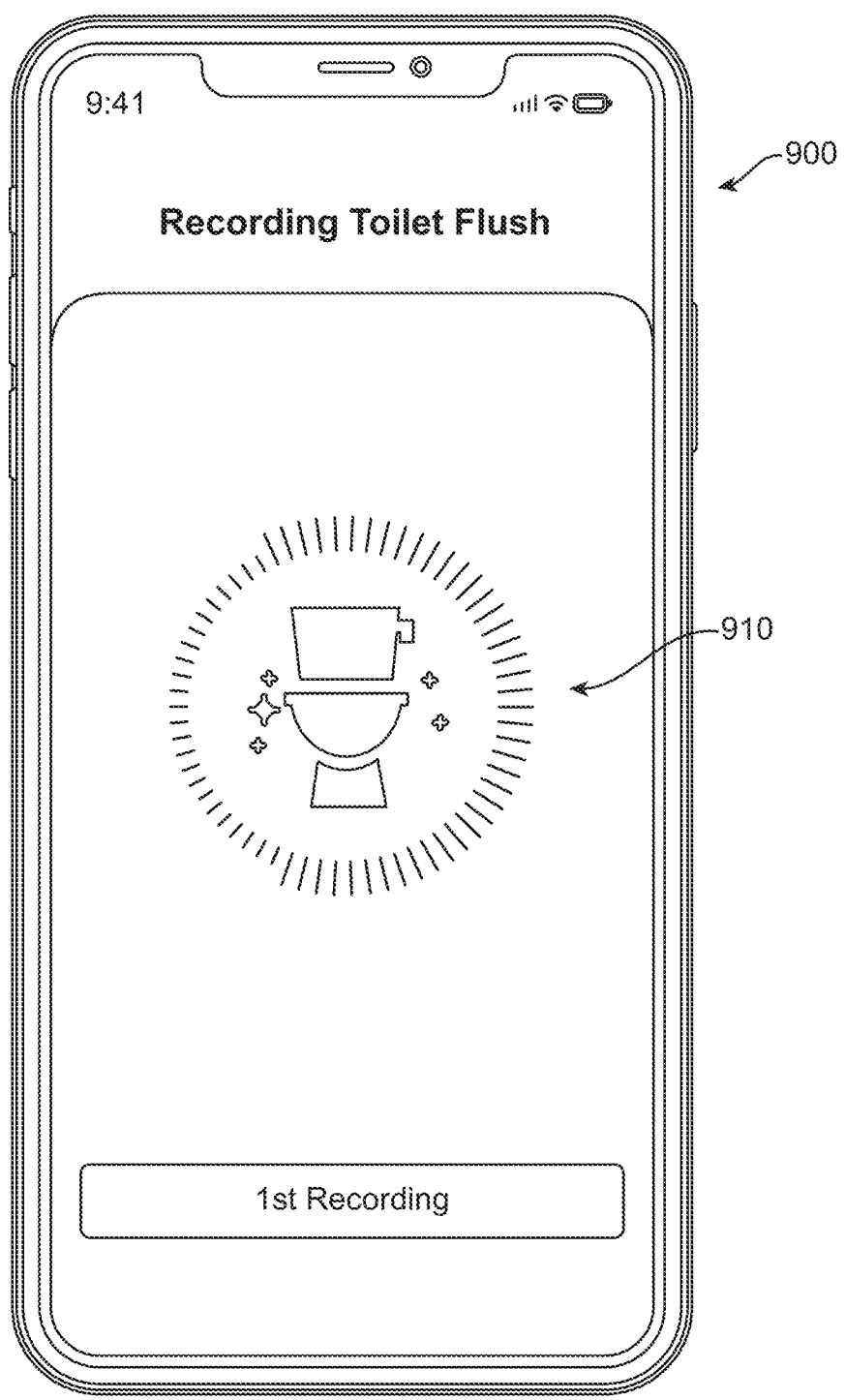
Figure 9C:
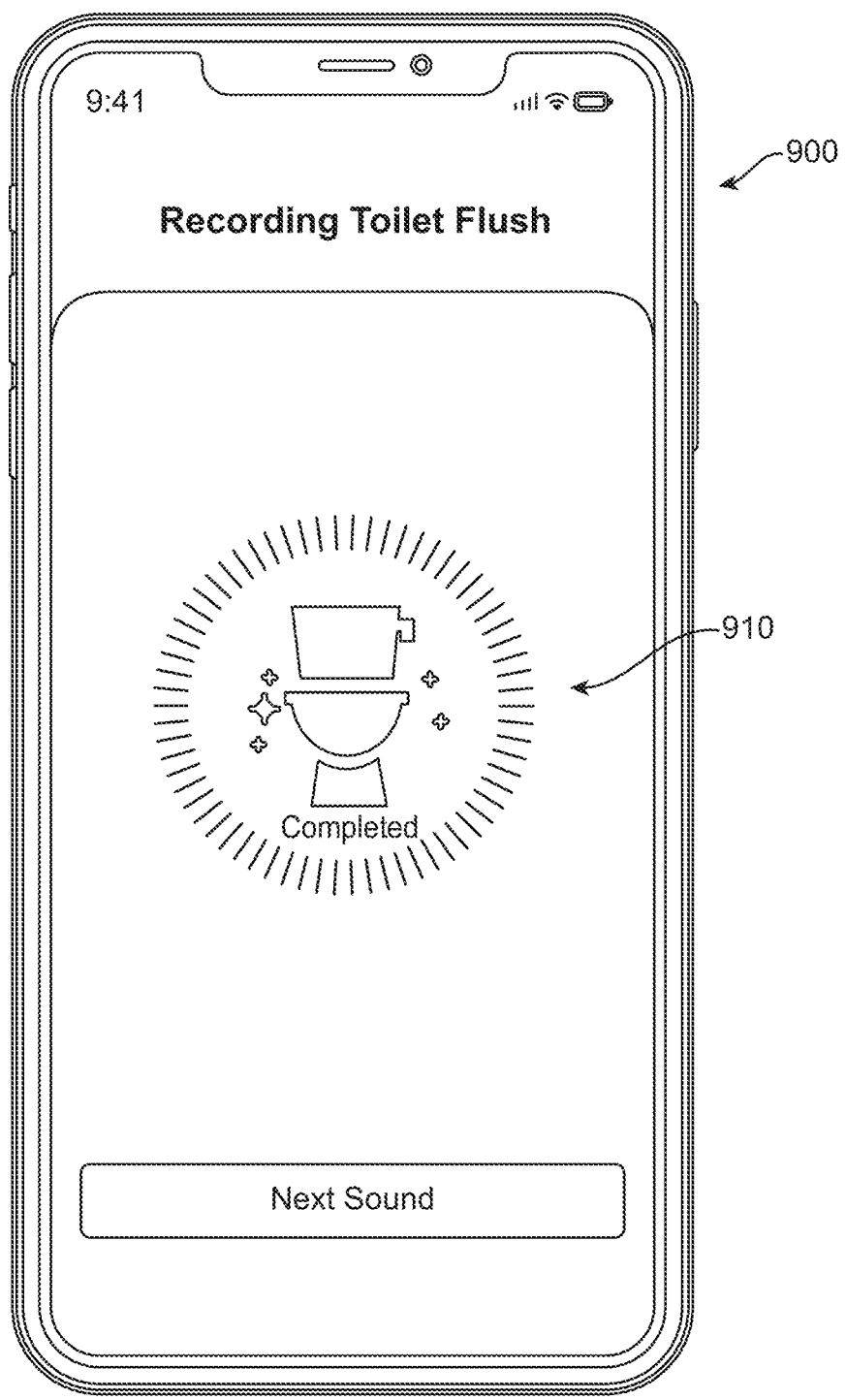

The configuration process includes the installer inputting the number of washroom elements at step 810. As shown in FIGS. 9*a*-9*c*, this input may be achieved through a companion mobile app 900 in communication with the device 300. Elements may generally include any fixture or apparatus that originates sound when in operation. Elements 905 may comprise sink, bathtub, shower, fan, doors, toilet, doors, the sound of footsteps on floor and other elements. The installer then inputs the number of each element at step 820 found in the ambient environment and may add certain characterizations of each element to better distinguish a particular washroom from other washroom environments. For example, the type of hand air dryer or toilet could be inputted. At least one sample audio recording for each element in operation 910 is preferably added at step 830, and those labeled samples are added to the ML dataset at step 840 to enhance the ML model detection of the user's hand hygiene compliance. The app requests and receives at least one or more of the sounds set out in FIG. 4*a*.

In the same manner, labeled motions may be added to the ML dataset. In one variation of the mobile app, the configurations of various physical layouts of the environment where the device is installed is preloaded into the app. This is likely feasible in commercial settings such as fast-food franchises where washroom configurations tend to be standardized. In this manner, the companion app 900 may assist in the quick configuration of the device 300. The installer can quickly input ambient environment information through a simplified user interface (UI) as shown in FIGS. 9*a*-9*c*.

Although actual data sampling of the ambient environment is described above, the present disclosure may utilize synthetic data. As the name suggests, this type of data is artificially created rather than being generated by actual events. It is often created with the help of algorithms and is used for a wide range of activities, including as test data for new products and tools, for model validation, and in AI/ML model training. Synthetic data is important because it can be generated to meet specific needs or conditions that are not available in existing (real) data. This can be useful in numerous cases such as:

- when privacy requirements limit data availability or how it can be used
- data is needed for testing a product to be released however such data either does not exist or is not available to the testers In the present disclosure, in one embodiment, synthetic data enables the entity that manages the device 300 and related systems to use ambient record data while still maintaining user confidentiality. The synthetic data may be combined with other PETs such as data masking and anonymization. The present disclosure includes modifying observed sensor data for purposes of adapting the training dataset towards a deployment environment. In this way, even if the actual captured sensor data is not from that specific ambient environment, the data may be leveraged for the target ambient environment. For instance, sensor data taken from a rest room in a bus station may be adapted for use in a football stadium. When the model training takes place is also a consideration. In one variation, the model may be trained prior to deployment, in another variation it may be trained over time in the deployment environment, or in yet another variation the model may be trained in a hybrid approach whereby you start with a training data set that mimics the deployment environment and then retrain/update the model after deployment, to adapt it to the specific target environment.

However, it must be noted that audio sounds may vary from restroom-to-restroom such as faucets (pressure of water), environmental noise (football stadium bathroom much louder compared to company office bathroom), etc. That being said, training specific models to adapt to certain environments such as dedicating one model to loud environmental distortion noise (football stadium, bars, airport) is desired.

FIGS. 10*a*-10*e*

Figure 10A:
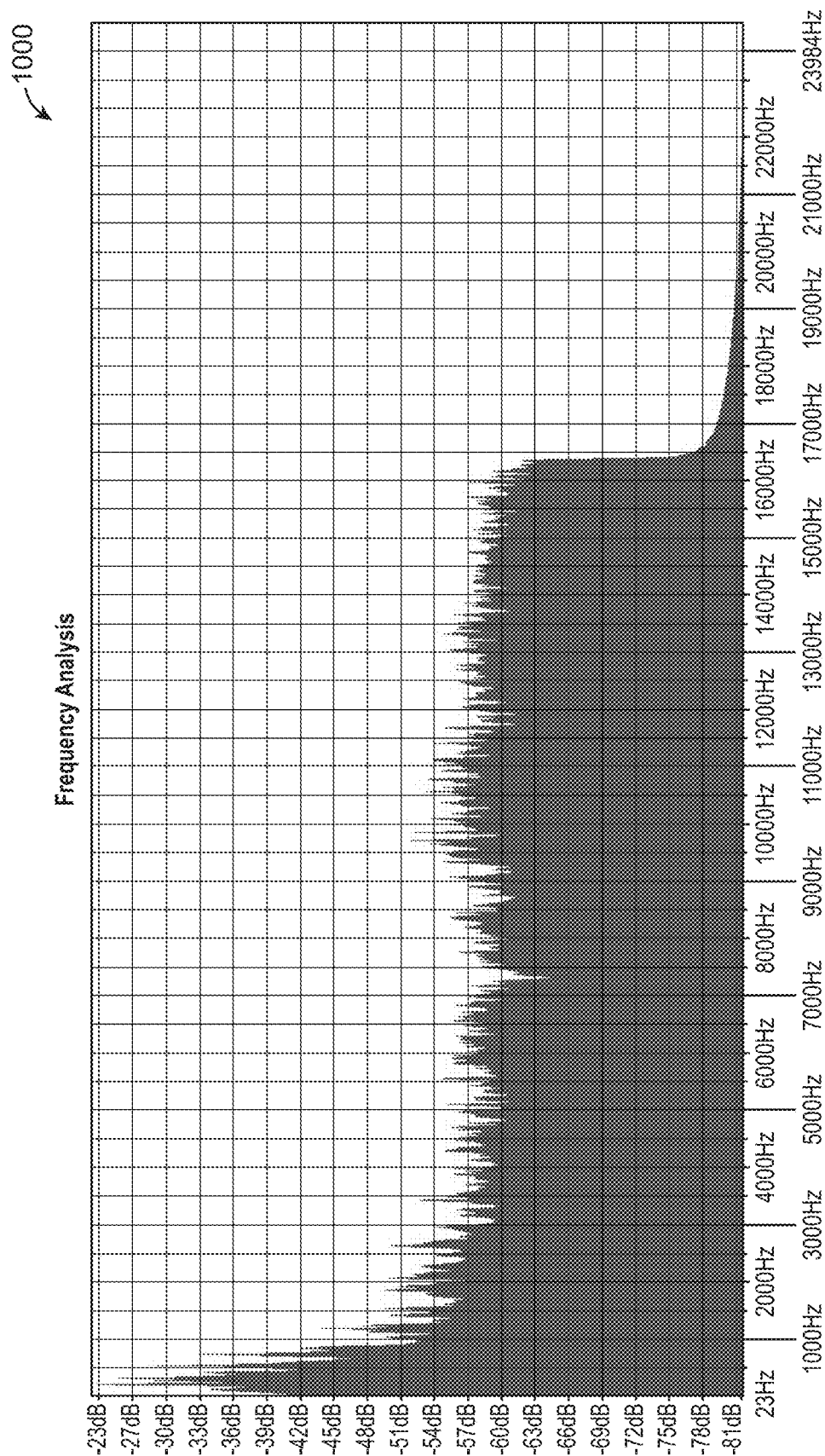
FIGS. 10a-10e illustrate exemplary audio profiles of various washroom elements.
Figure 10B:
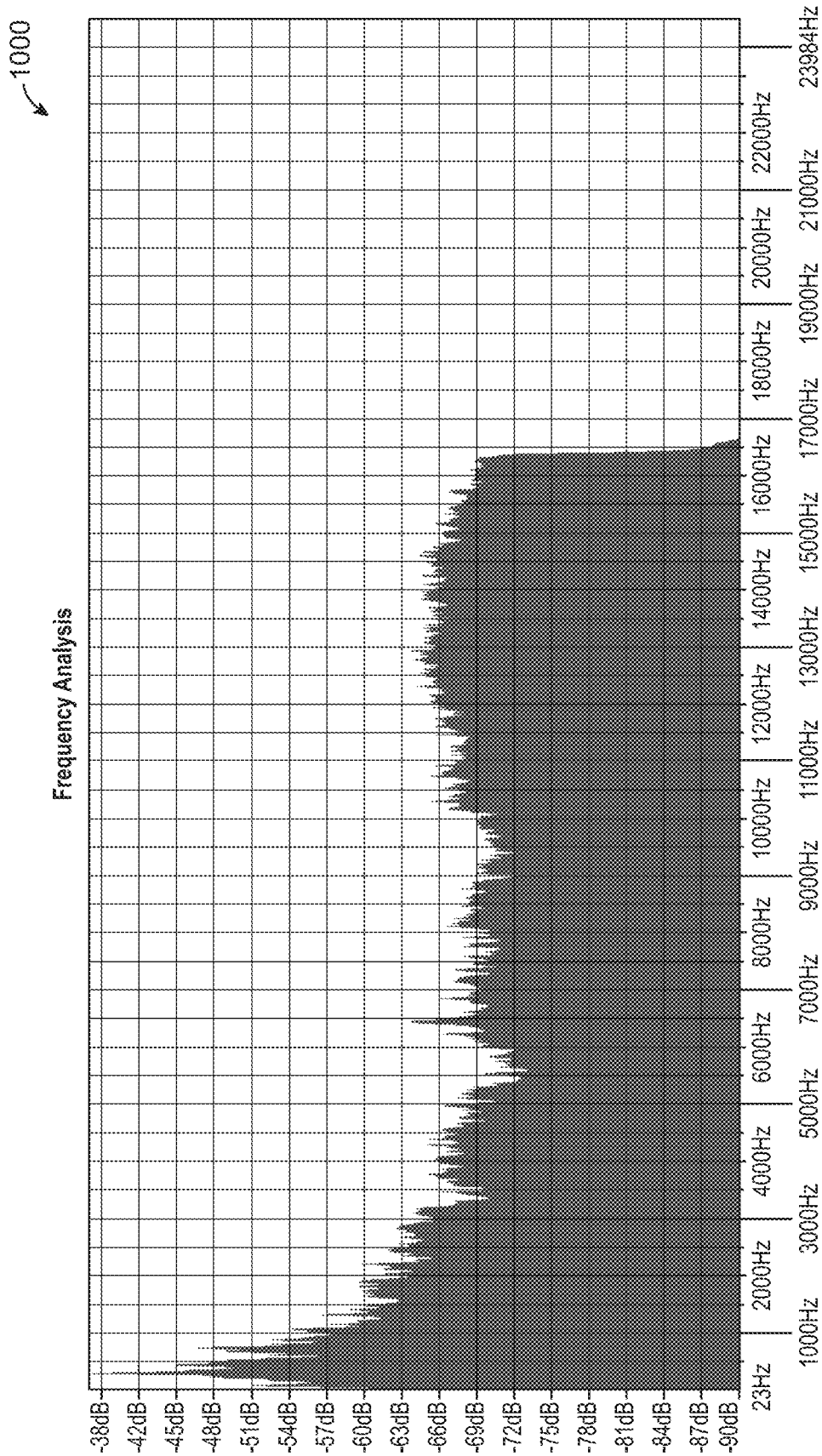
Figure 10C:
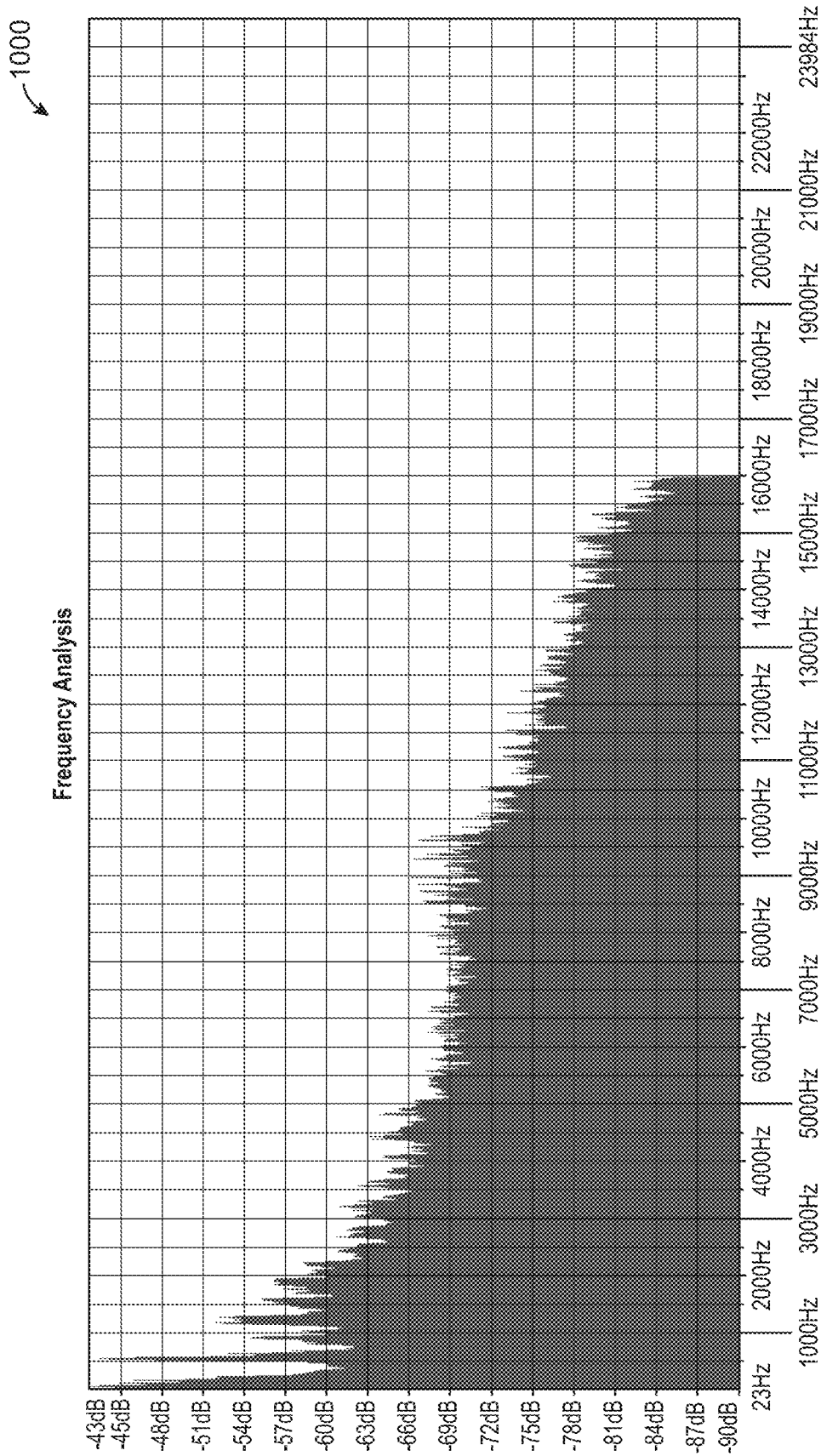

The process description below sets forth one analytic approach without the use of ML described earlier to determine the type of element (toilet flush, fan, etc.) that is detected in the audio signal received by the device 300. It is within the scope of the present disclosure to incorporate some of the process below with the ML process description above. FIGS. 10*a*-10*c* are sample audio signal spectrum observations 1000 associated with flushes from three different toilets. Samples were collected over approximately a thirty second timespan. The vertical axis units are decibels whilst the horizontal axis is the frequency of the audio signal measured in Hertz for an element being monitored for its audio signal. The initialization/learning phase begins with measuring the power of the element. The power, which is the energy in a predetermined frequency band, is measured. A power ratio, for the element, is then established by dividing the power from the first band filter by the power from the second band filter. A ratio range is established for the element and variations thereof. A similar process occurs for a second element. Once the learning phase is established for various elements, when the trained device 300 receives an audio signal, the power ratio of the signal is measured and the type of element originating the audio signal may be determined by the association of the ratio range established for an element.

Figure 10D:
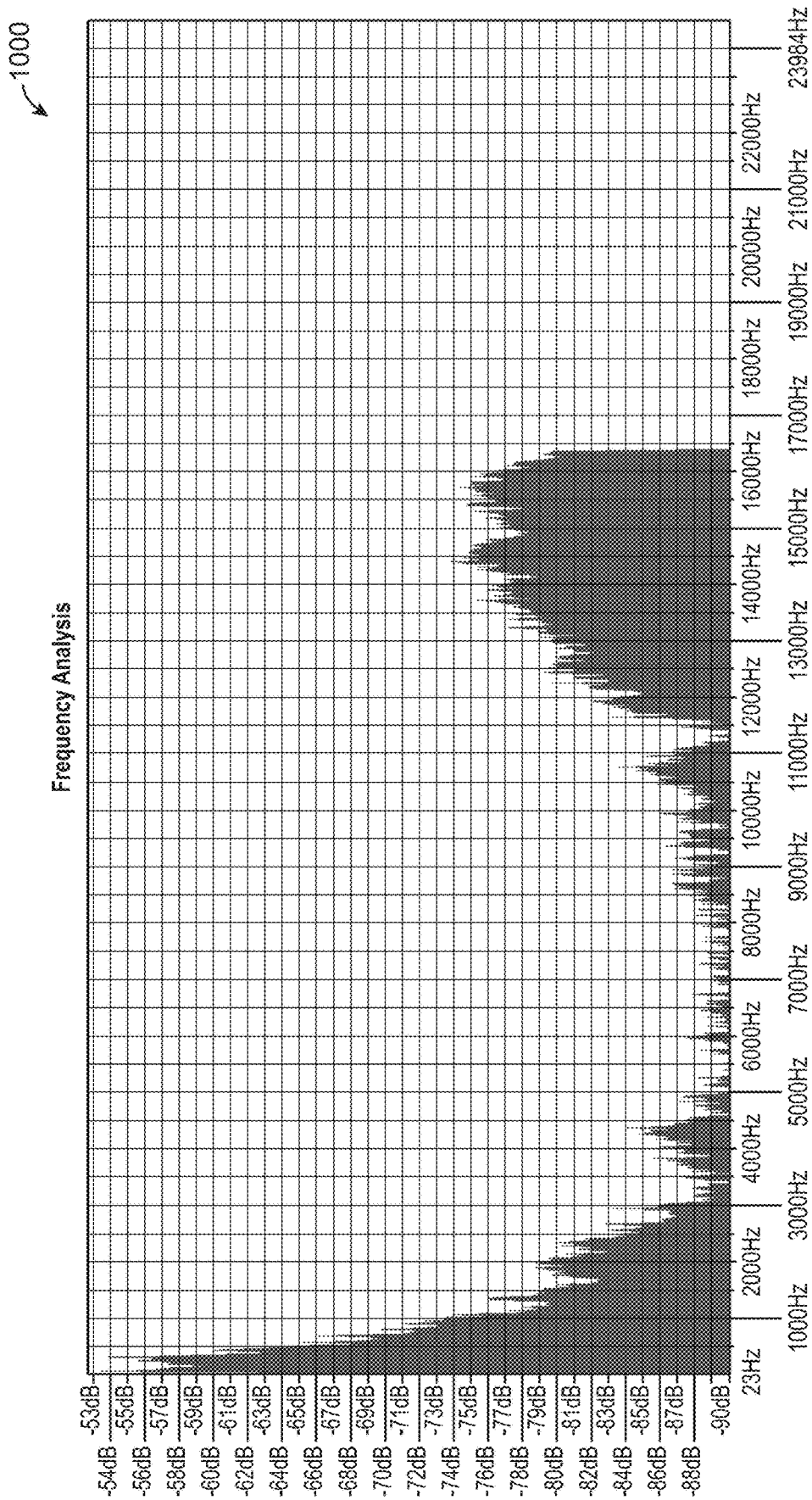
Figure 10E:
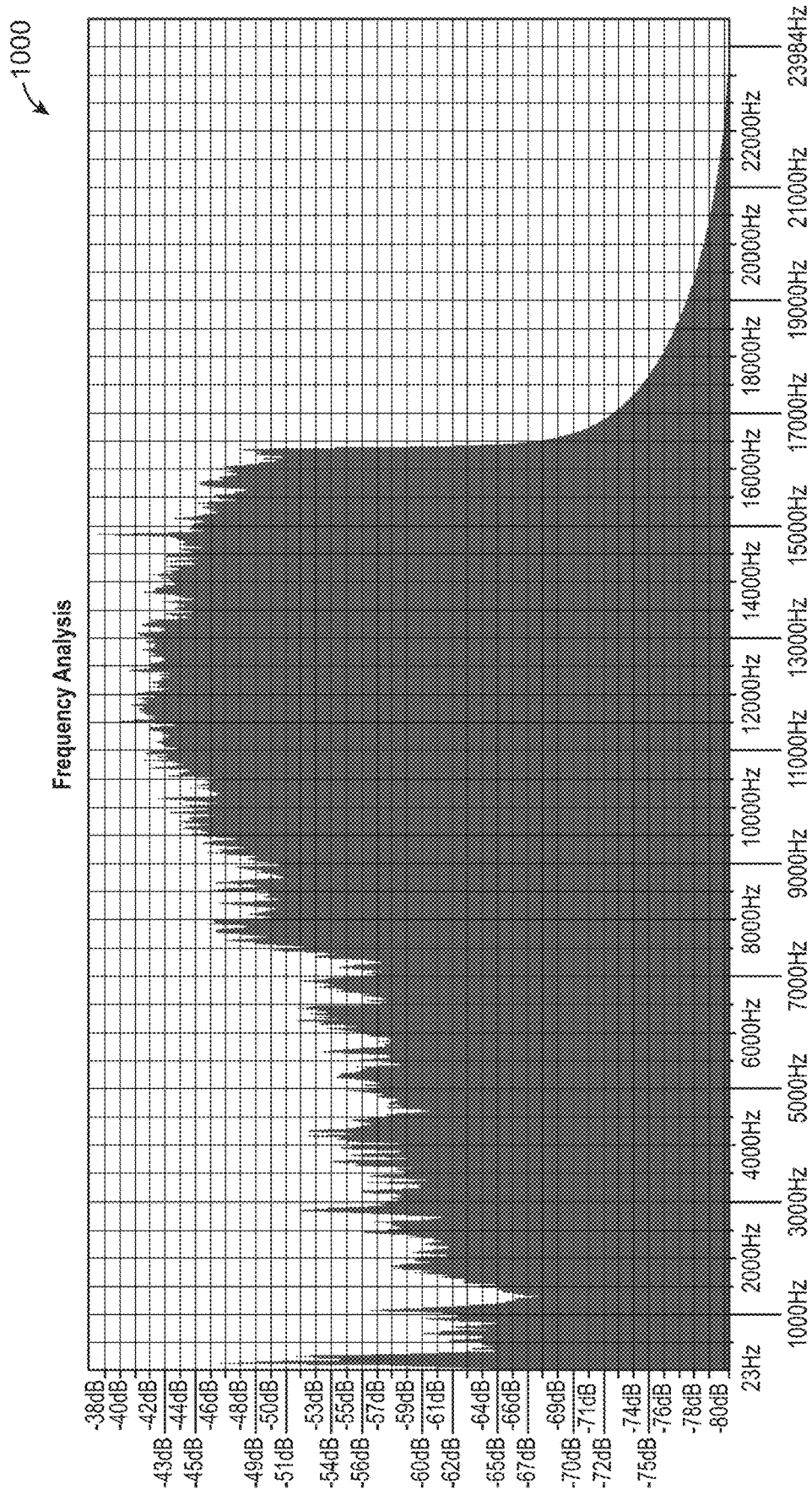

By way of example, a first bandpass filter is set for 0-600 Hz, and a second bandpass filter is set for 3000-5000 Hz. The power of the first bandpass is divided by the power of the second bandpass to establish a power ratio. With reference to FIGS. 10*a*-10*c*, the power ratio of the toilet flushes is approximately 3 through 7 (meaning the power in the first bandpass is 3 to 7 times more powerful than the second bandpass). Similarly, FIGS. 10*d* and 10*e* are sample audio signal observations 1000 associated, respectively, with an exemplary bathroom fan and faucet running water into a sink. In contrast to the toilet flush, with reference to FIG. 10*d*, the fan tends to have a power ratio of greater than 7. Hence, if the device 300 determines a ratio of greater than 7, the origination of the audio signal is presumed to be a fan. Likewise, with reference to FIG. 10*e*, the faucet running water into the sink tends to have a power ratio less than 3. The above-described bands were chosen specifically for a specific device configuration (e.g., processor limitations of the testing device); however, various bands may be adopted depending in part with the processor capabilities.

RFID Enabled Device

In one embodiment, the device has a Radio Frequency Identification (RFID) reader means. RFID uses radio waves produced by a reader to detect the presence of (then read the data stored on) an RFID tag. RFID tags may be in small items like cards, buttons, or name tags on uniforms. This particular embodiment is useful for use in the hospitality or healthcare industry where employees are wearing RFID-enabled name tags or employee badges, and where collection of PII as it relates to employees in their role at their work environment is acceptable. Employers are then able to enhance the compliance of the proper handwashing protocol of their employees when the device is in use. If the device detects non-compliance, a notification is sent to the appropriate person or system to inform the particulars of the user's non-compliance.

Gamification

In one variation, information is collected in the aggregate and stored on a datastore for dissemination in a way that illustrates the adherence of certain washroom facilities compared to others. For example, a geographically diverse fast food business can readily identify where problematic users are located by the lack of adherence to the recommended steps. In an alternative variation, users may opt to share their experience (on whatever social media platform of their choice) of compliance with proper handwash. They may do so by scanning a barcode or other unique identifier associated with the device to share stats of how well that particular washroom is doing in having users comply with properly washing their hands. In another variation, the device displays a statistic to recognize the user's contribution to help fend off the spread of germs and disease by performing a proper handwash—for example: "Congratulations, you are 400th person today to properly handwash. Be clean, be safe and be healthy!".

Voice Recognition and FIG. 4c

The present disclosure, in another variation, detects a user's voice as it only relates to issues associated with washroom hygiene-related issues. Some examples of the limited context of the voice it may detect and recognize are set forth in FIG. 4c. The intention of limiting the recognition of voice is to reduce the concerns relating to protecting the user's privacy. The issues in FIG. 4c may trigger in this variation a new response by the device to modify the recommended handwashing steps and/or seek to remedy the outstanding issue by informing the appropriate janitorial staff.

Thermal Sensing Device

In another variation of the present disclosure, with reference to FIG. 3a, an additional input device in the form of a thermal sensing device may be added to device 300. With adequate adaptation, this will add considerable new functionality in the form of better detecting user deviation from the recommended handwashing protocol. The thermal sensing device will, for example, better distinguish when a user simply walks past the device, perhaps to use the washroom facilities, including the urinal or toilet, versus leaving the washroom without attending to wash his/her hands. The thermal sensing device could combine audio data from the audio input device and/or motion-sensing device to further enhance the positive determination of this deviation. Hence, this deviation detection is directed to determine whether the user intends to use the sink to wash his/her hands. As an alternative to the thermal sensor, an optical video capture device may be substituted. This may raise privacy issues that need to be addressed using PET.

In another aspect, a system to encourage hand hygiene comprises a first device and a second device that cooperates with a toilet. The first device is situated at or near the sink area while the second device is situated in or at the toilet tank area. The second device communicates with the first device when the second device detects the flushing operation of a toilet.

The second device comprising a microprocessor, power source, wireless transmitter, and sensor. The sensor may be an accelerometer, a motion sensor, or an infra-red sensor. The second device may comprise a waterproof or water-resistant housing that may be floatable on the surface of water found in the toilet tank or cistern. Alternatively, the second device sits on the lip of the tank and detects the water displacement. Detection could be sound, vibration, visual, infrared, motion, or some combination thereof.

In one aspect, the second device detects the displacement of water from a first level to a second level in the toilet tank or cistern after a flush operation occurs in the toilet. Upon this detection, the second device wirelessly communicates information through the wireless transmitter to the first device about the flush operation. The first device, upon receiving this information, activates its functionality that hand-hygiene related activity may soon ensue. Such functionality includes visual and/or audio annunciation to wash hands.

It should be noted that while certain steps within procedures may be optional as described above, the steps are shown in FIGS. 5*a*, 5*b*, 6*a*, 6*b*, and 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while some procedures are described separately, certain steps from each procedure may be incorporated into each other procedure, and the procedures are not meant to be mutually exclusive.

For example, while certain embodiments are described herein with respect to using certain models for purposes of non-compliance detection, the models are not limited as such and may be used for other functions in other embodiments. In addition, while certain recommended handwashing protocols are shown, other suitable protocols may be used accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, sensor data captured by one or more sensors deployed in a washroom, the sensor data comprising audio signals;
identifying, by the device and using the sensor data as input to one or more machine learning-based classifiers, one or more events associated with a user of the washroom;
identifying, by the device and based on the sensor data, a maintenance issue associated with the washroom;
modifying, by the device and based on the sensor data and on the identified maintenance issue, one or more steps of a hand hygiene protocol;
after modifying the one or more steps of the hand hygiene protocol, making, by the device, a decision as to whether the one or more events comply with the hand hygiene protocol; and
providing, by the device, data indicative of the decision for presentation to the user.

2. The method as in claim 1, wherein the sensor data further comprises motion signals indicative of movements by the user.

3. The method as in claim 2, wherein the one or more machine learning-based classifiers comprises a motion classifier.

4. The method as in claim 1, wherein providing the data indicative of the decision for presentation to the user comprises:
customizing the data indicative of the decision based in part on a history of compliance with the hand hygiene protocol by the user.

5. The method as in claim 1, wherein the data indicative of the decision further indicates a comparison between the decision and other decisions made regarding compliance with the hand hygiene protocol by others.

6. The method as in claim 1, further comprising:
sending, by the device, an alert regarding the identified maintenance issue.

7. The method as in claim 1, wherein the identified maintenance issue is selected from a group consisting of: no soap, no paper towels, a broken towel dispenser, a broken soap dispenser, a dirty washroom, and a dirty sink.

8. The method as in claim 1, wherein the sensor data comprises voice recognition data, and the maintenance issue is identified based on the voice recognition data.

9. The method as in claim 1, wherein the one or more sensors comprises a Radio Frequency Identification (RFID) reader.

10. The method as in claim 1, wherein identifying the one or more events associated with the user comprises:
obfuscating, by the device, personally identifiable information of the user that is present in the sensor data.

11. The method as in claim 1, further comprising:
providing, by the device, data indicative of a step of the hand hygiene protocol for presentation to the user, prior to identifying the one or more events.

12. The method as in claim 1, wherein the audio signals are indicative of running water or of use of soap by the user.

13. The method as in claim 1, wherein the data indicative of the decision comprises an instruction to perform a particular step of the hand hygiene protocol.

14. The method as in claim 1, further comprising:
outputting, by the device, music via an audio output device for a period during which one or more steps of the hand hygiene protocol are to be completed.

15. The method as in claim 1, wherein the provided data comprises display data for presentation by an electronic display, the display data comprising a time counting element alongside a graphical indication of a step of the hand hygiene protocol.

16. The method as in claim 1, wherein the one or more sensors deployed to the washroom comprises a thermal sensor.

17. An apparatus comprising:
one or more interfaces;
a microprocessor coupled to the one or more interfaces; and
a memory storing instructions that, when executed by the microprocessor, are configured to:
obtain sensor data captured by one or more sensors deployed in a washroom, the sensor data comprising audio signals;
identify, using the sensor data as input to one or more machine learning-based classifiers, one or more events associated with a user of the washroom;
identify, based on the sensor data, a maintenance issue associated with the washroom;
modify, based on the sensor data and on the identified maintenance issue, one or more steps of a hand hygiene protocol;
after modifying the one or more steps of the hand hygiene protocol, make a decision as to whether the one or more events comply with the hand hygiene protocol; and
provide data indicative of the decision for presentation to the user.

18. A tangible, non-transitory, computer-readable medium storing program instructions that cause a device to execute a process comprising:
obtaining, by the device, sensor data captured by one or more sensors deployed in a washroom, the sensor data comprising audio signals;
identifying, by the device and using the sensor data as input to one or more machine learning-based classifiers, one or more events associated with a user of the washroom;
identifying, by the device and based on the sensor data, a maintenance issue associated with the washroom;
modifying, by the device and based on the sensor data and on the identified maintenance issue, one or more steps of a hand hygiene protocol;
after modifying the one or more steps of the hand hygiene protocol, making, by the device, a decision as to whether the one or more events comply with the hand hygiene protocol; and
providing, by the device, data indicative of the decision for presentation to the user.

* * * * *